United States Patent
Mallela et al.

(10) Patent No.: US 12,276,504 B2
(45) Date of Patent: *Apr. 15, 2025

(54) SYSTEM AND METHOD FOR INTERSECTION MANAGEMENT BY AN AUTONOMOUS VEHICLE

(71) Applicant: DEKA Products Limited Partnership, Manchester, NH (US)

(72) Inventors: Praneeta Mallela, Manchester, NH (US); Aaditya Ravindran, Manchester, NH (US); Benjamin V. Hersh, Raymond, NH (US); Boris Bidault, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,972

(22) Filed: Mar. 11, 2024

(65) Prior Publication Data

US 2024/0263946 A1 Aug. 8, 2024

Related U.S. Application Data

(63) Continuation of application No. 17/214,300, filed on Mar. 26, 2021, now Pat. No. 11,927,445.

(Continued)

(51) Int. Cl.
*G06V 10/00* (2022.01)
*B60W 30/18* (2012.01)
(Continued)

(52) U.S. Cl.
CPC ..... *G01C 21/005* (2013.01); *B60W 30/18154* (2013.01); *B60W 60/001* (2020.02);
(Continued)

(58) Field of Classification Search
CPC ............... G06V 20/582; G06V 20/584; G06V 2201/07; G01C 21/005; G01C 21/20;
(Continued)

(56) References Cited

U.S. PATENT DOCUMENTS 8,559,673 B2 10/2013 Zhu et al.
8,712,624 B1 4/2014 Ferguson et al.
(Continued)

OTHER PUBLICATIONS

Bansal et al., "ChauffeurNet: Learning to Drive by Imitating the Best Synthesizing the Worst," http://arxiv.org/pdf/1812.03079.pdf (Dec. 7, 2018) (20 pages).

(Continued)

*Primary Examiner* — Amir Alavi
(74) *Attorney, Agent, or Firm* — William A. Bonk, III

(57) ABSTRACT

Systems and methods for navigating intersections autonomously or semi-autonomously can include, but are not limited to including, accessing data related to the geography and traffic management features of the intersection, executing autonomous actions to navigate the intersection, and coordinating with one or more processors and/or operators executing remote actions, if necessary. Traffic management features can be identified by using various types of images such as oblique images.

18 Claims, 35 Drawing Sheets

Related U.S. Application Data

(60) Provisional application No. 63/001,329, filed on Mar. 28, 2020.

(51) Int. Cl.
  *B60W 60/00* (2020.01)
  *G01C 21/00* (2006.01)
  *G06V 20/58* (2022.01)

(52) U.S. Cl.
  CPC .......... *G06V 20/582* (2022.01); *G06V 20/584* (2022.01); *B60W 2420/403* (2013.01); *B60W 2554/20* (2020.02); *B60W 2554/4042* (2020.02); *B60W 2554/4044* (2020.02); *G06V 2201/07* (2022.01)

(58) Field of Classification Search
  CPC .......................... G01C 21/3602; G01C 21/36; G01C 21/3407; B60W 2554/20; B60W 2554/4042; B60W 2554/4044; B60W 2552/53; B60W 30/18159; B60W 30/18154; B60W 30/12; B60W 60/00; B60W 60/256; B60W 60/001; G05D 1/00
  See application file for complete search history.

(56) References Cited

U.S. PATENT DOCUMENTS

| | | | |
|---|---|---|---|
| 9,081,383 B1 | 7/2015 | Montemerlo et al. | |
| 9,747,793 B1 | 8/2017 | Li et al. | |
| 9,818,299 B1 | 11/2017 | Jammoussi et al. | |
| 10,126,136 B2 | 11/2018 | Iagnemma | |
| 10,338,591 B2 | 7/2019 | Baalke | |
| 10,437,256 B2 * | 10/2019 | Andert | G08G 1/166 |
| 10,559,197 B2 * | 2/2020 | Yang | G08G 1/166 |
| 10,573,178 B2 * | 2/2020 | Nascimento | H04L 67/12 |
| 10,837,789 B2 * | 11/2020 | Sunil Kumar | G01C 21/3446 |
| 10,990,096 B2 | 4/2021 | Isele | |
| 11,011,056 B2 * | 5/2021 | Wang | G05D 1/0088 |
| 11,127,298 B2 * | 9/2021 | Wang | H04W 4/40 |
| 11,158,188 B2 * | 10/2021 | Ray | G06V 20/597 |
| 11,269,330 B2 * | 3/2022 | Khayatian | G08G 1/0133 |
| 11,422,559 B2 * | 8/2022 | Dev | G06V 40/28 |
| 11,480,971 B2 | 10/2022 | Isele | |
| 11,618,451 B2 | 4/2023 | Garcia | |
| 11,927,445 B2 * | 3/2024 | Mallela | G06V 20/582 |
| 2012/0083960 A1 | 4/2012 | Zhu et al. | |
| 2014/0180914 A1 | 6/2014 | Abhyanker | |
| 2016/0027300 A1 * | 1/2016 | Raamot | G08G 1/0145 340/922 |
| 2018/0326982 A1 | 11/2018 | Paris et al. | |
| 2021/0303882 A1 | 9/2021 | Mallela et al. | |

OTHER PUBLICATIONS

Invitation to Pay Additional Fees and Where Applicable, Protest Fee, dated Jul. 21, 2021, received in International patent application No. PCT/US2021/024445 (2021) (13 pages).
Dubrofsky, "Homography Estimation" Master's Essay, The University of British Columbia, (2009) (32 pages).
Faurfield et al, "Traffic light mapping and detection," 2011 IEEE International Conference on Robotics and Automation, Shanghai, pp. 5421-5426 (2011) (6 pages).
International Search Report and Written Opinion mailed Sep. 13, 2021, issued in PCT Patent Application No. PCT/US2021/024445, 18 pages.
Kammel, S. et al., "Team AnnieWAY's Autonomous System for the DARPA Urban Challenge 2007" In: Buehler M., Iagnemma K., Singh S. (eds) The DARPA Urban Challenge. Springer Tracts in Advanced Robotics, vol. 56. Springer, Berlin, Heidelberg. https://doi.org/10.1007/978-3-642-03991-1_9 (2009) (35 pages).
Kearney, J. K. "Traffic Generation for Studies of Gap Acceptance" [Conference paper]. DSC, Paris, France, ISSN 0769-0266. (2006) (10mis).
Liu, et al., "Speed profile planning in dynamic environments via temporal optimization," 2017 IEEE IntelliJ?ent Vehicles Symposium (IV), pp. 154-159 (2017).
Montemerlo, M., et al., Junior: The Stanford Entry in the Urban Challenge. In: Buehler M., Iagnemma K., Singh S. (eds) The DARPA Urban Challenge. Springer Tracts in Advanced Robotics, vol. 56, Springer, Berlin, Heidelberg. Http://doi.org/10.1007/978-3-642-03991-1_3 (2009) (31 pages).
Montemerlo, et al. Stanford Driving Software [Computer software] https://sourceforge.net/projects/stanforddriving/ (2016) (25,436 pages).
Urmson, et al., "Autonomous driving in urban environments: Boss and the Urban Challenge" Journal of Field Robotics: Special Issue on the 2007 DARPA Urban Challenge, vol. 25(8), pp. 425-466 (2008) (42 pages).
van der horst, et al., "Time-to-Collision and Collision Avoidance Systems" 6th ICTCT Workshop Salzburg (1994) (12 pages).
Waslander, et al., "Lesson 3: Handling an Intersection Scenario with Dynamic Objects." Coursera, www.coursera.org /lecture/motion-planning-self-driving-cars/lesson-3-handling-an-intersection-scenario-with-dynamic-objects-FIZIg (transcript provided) best known date to which the document was available is 2019 ( 4 pages).
Waslander, et al., "Lesson 2: Handling an Intersection Scenario without Dynamic Objects." Coursera, www.coursera.org/lecture/motion-planning-self-driving-cars/lesson-2-handling-an-intersection-scenario-without-dynamic-objects-aAxIX. (Transcript provided); best known date to which the document was available is 2019 (3 pages).

\* cited by examiner

TLOutOfFOVDistance_m = ( TLHeight_m - CameraHeight_m ) / ( tan( CameraFOV_rad / 2 ) )

| | |
|---|---|
| TLOutOfFOVDistance_m | Radius of the half-circle |
| TLHeight_m | Height of the top of the traffic light box relative to the ground (in meters) |
| CameraHeight_m | Height of the AV camera relative to the ground (in meters) |
| CameraFOV_rad | Fields of view of the camera, for example, 56.36 degrees |

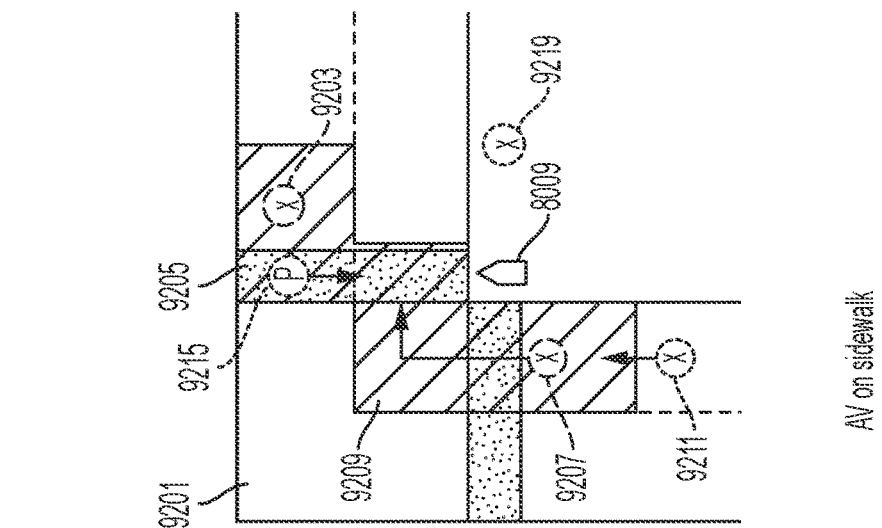
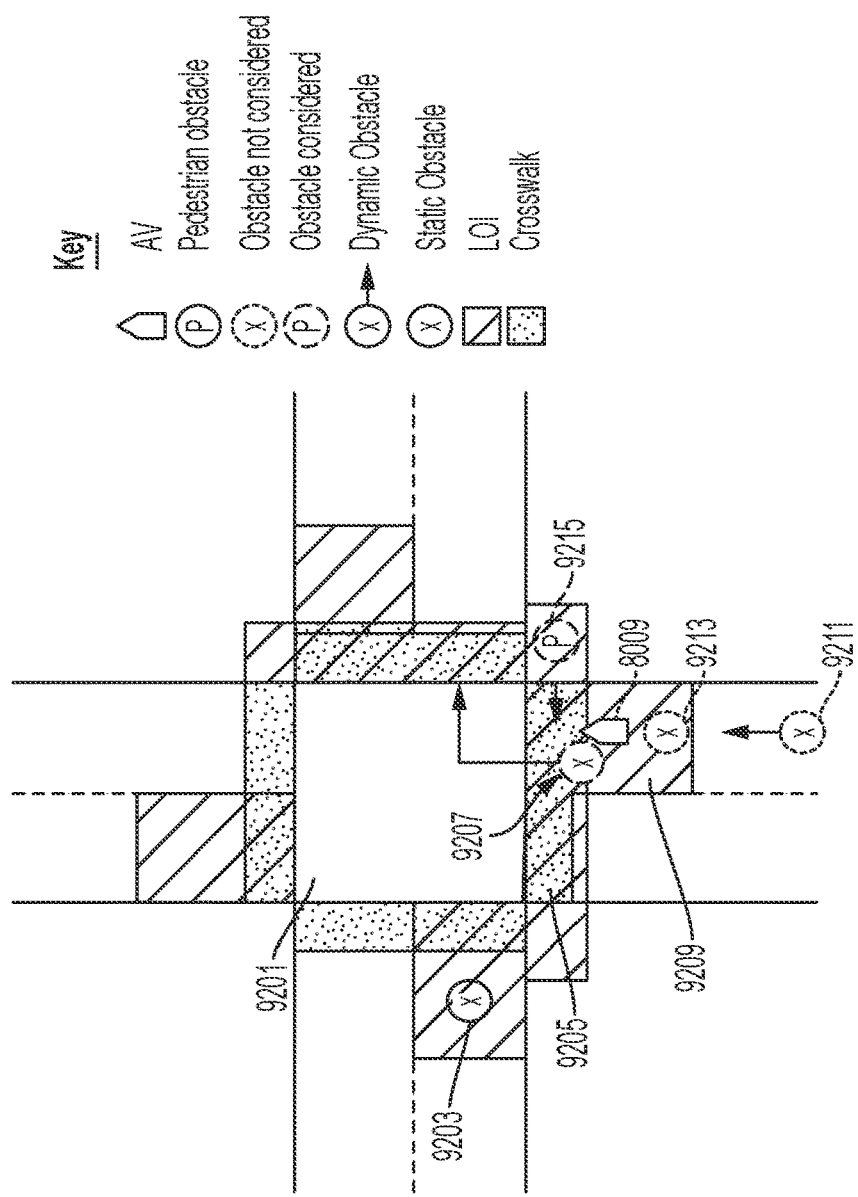
FIG. 6B  AV on sidewalk
FIG. 6A  AV on road

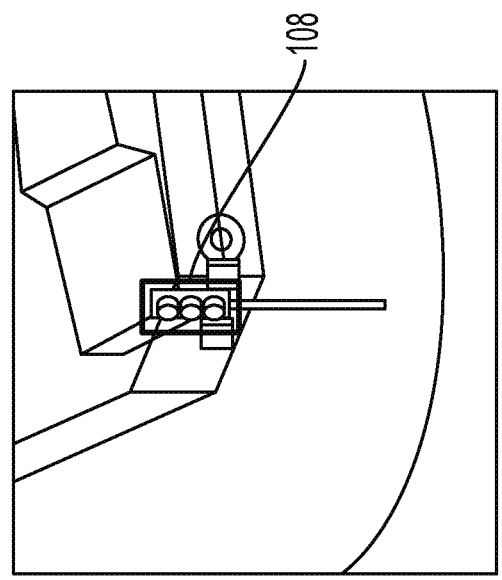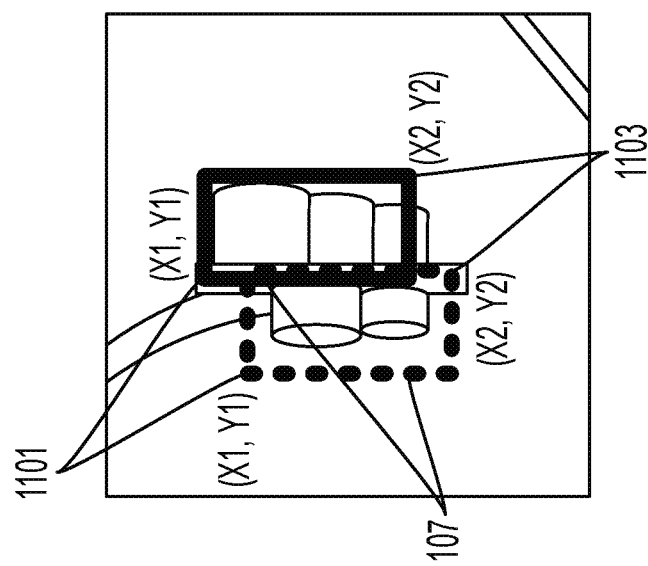
FIG. 10

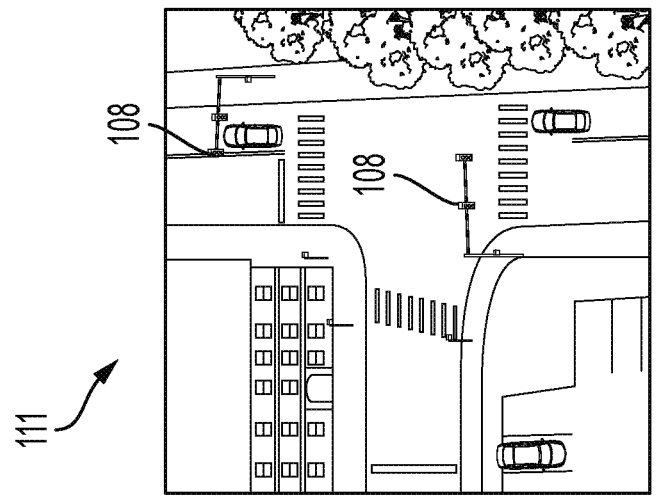
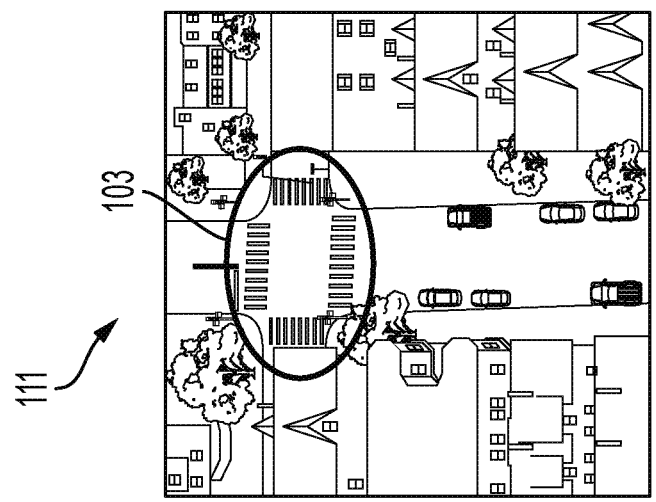
FIG. 11

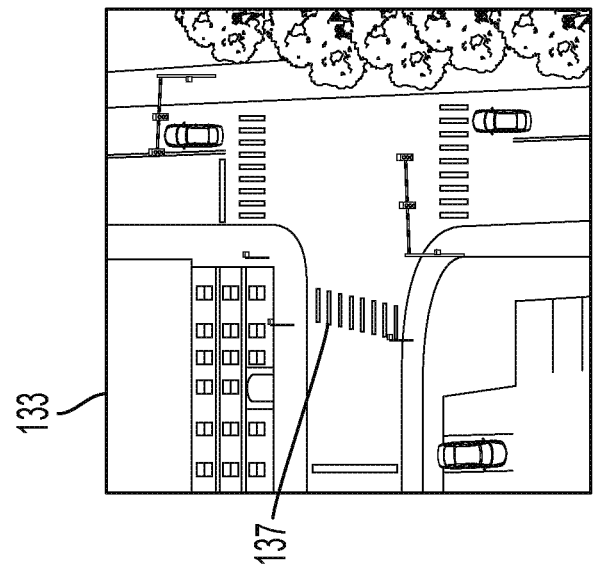
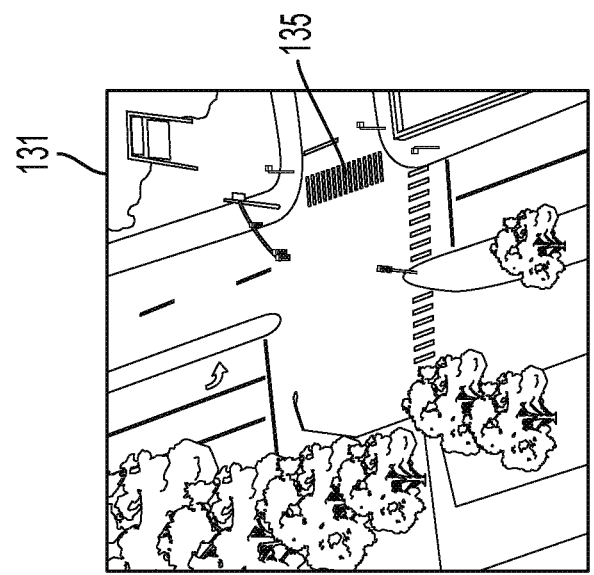
FIG. 12

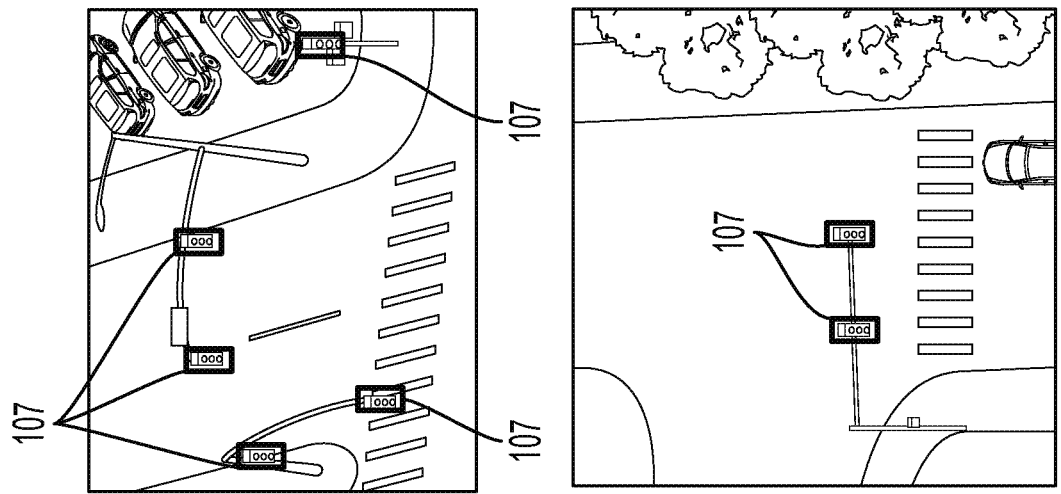
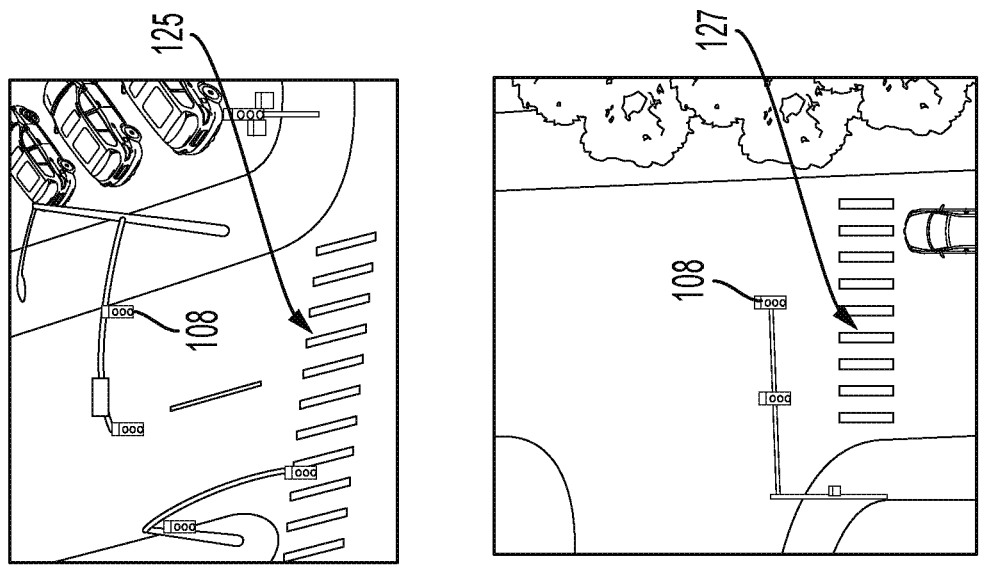
FIG. 13

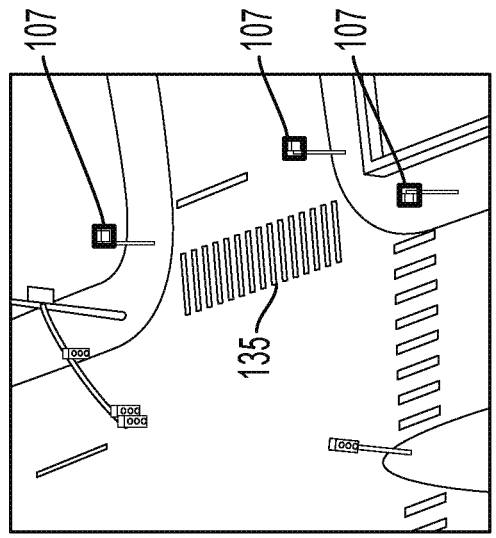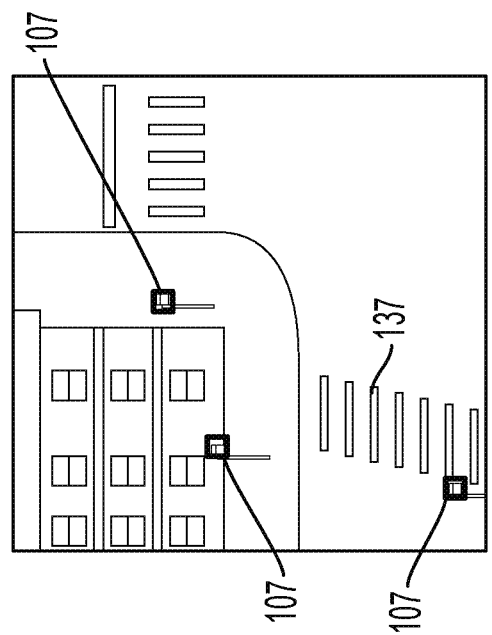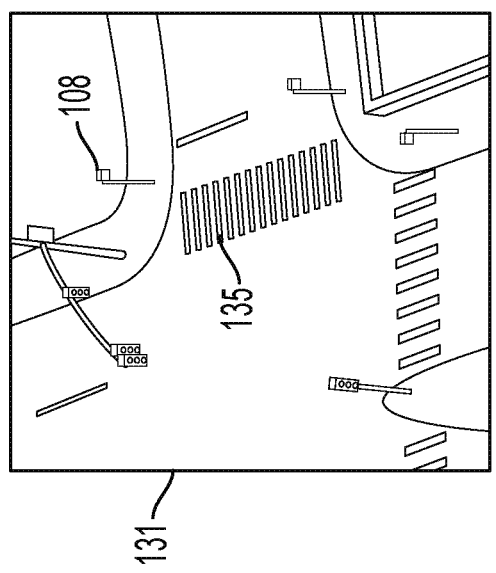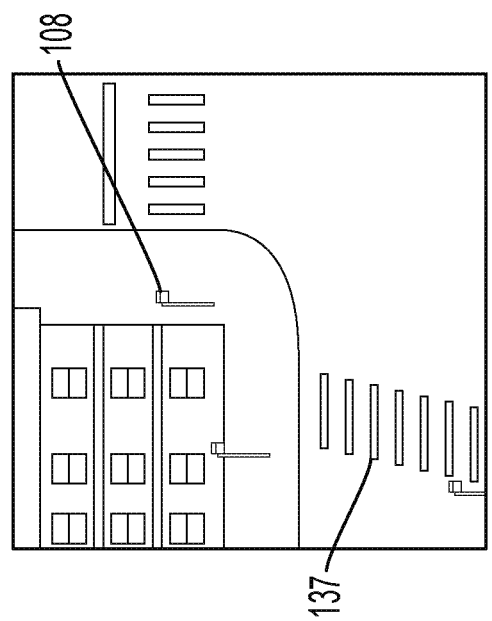
FIG. 14

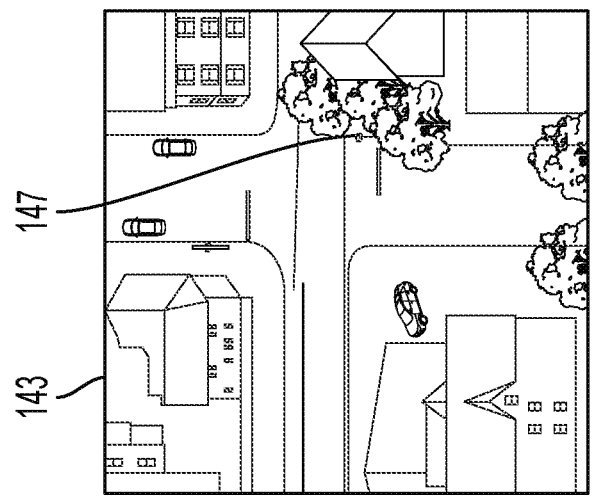
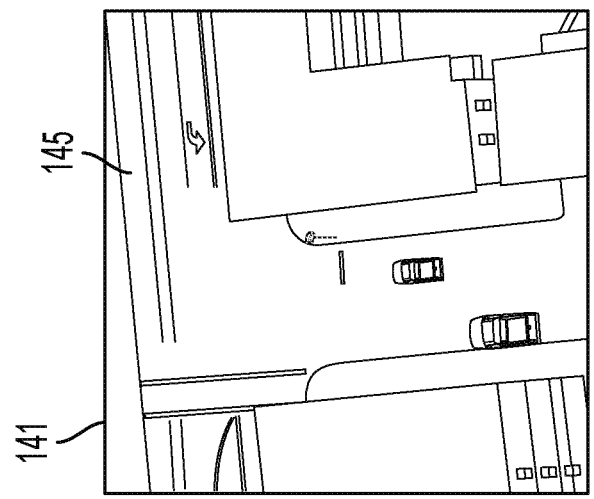
FIG. 15

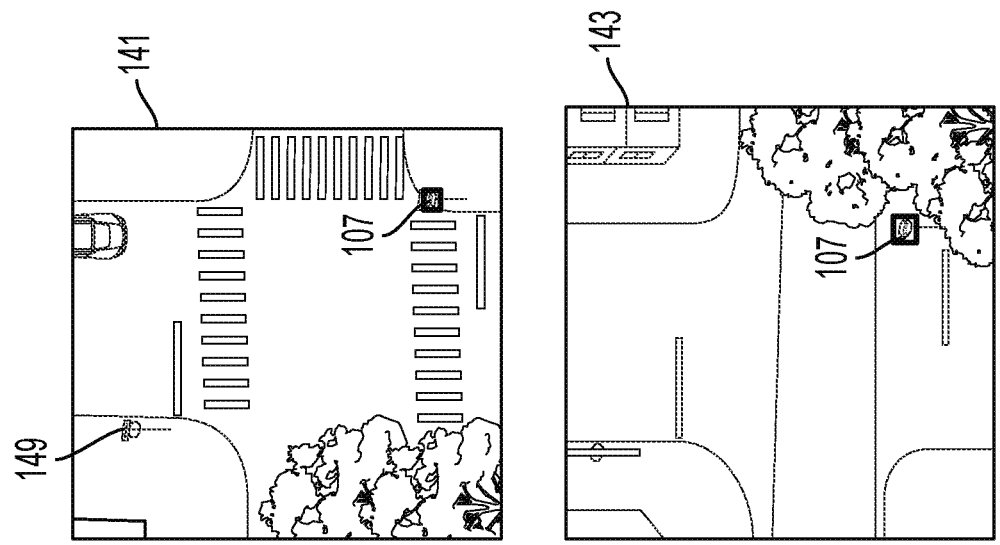
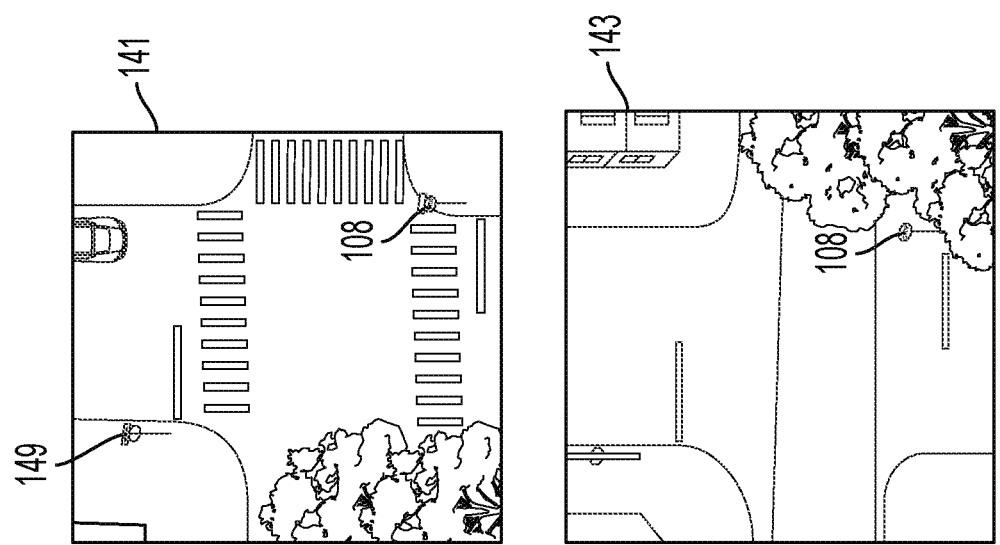
FIG. 16

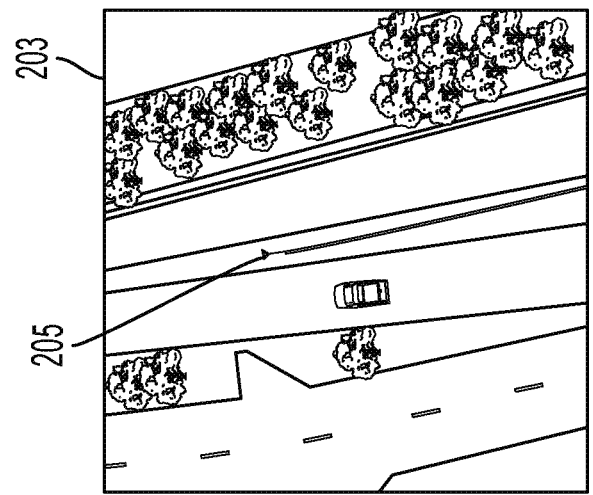
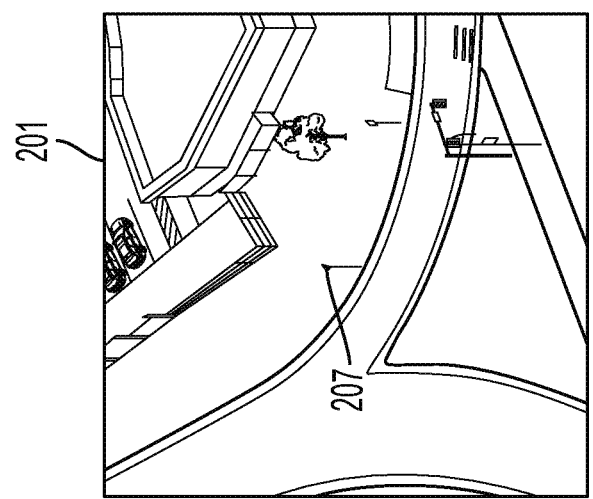
FIG. 17

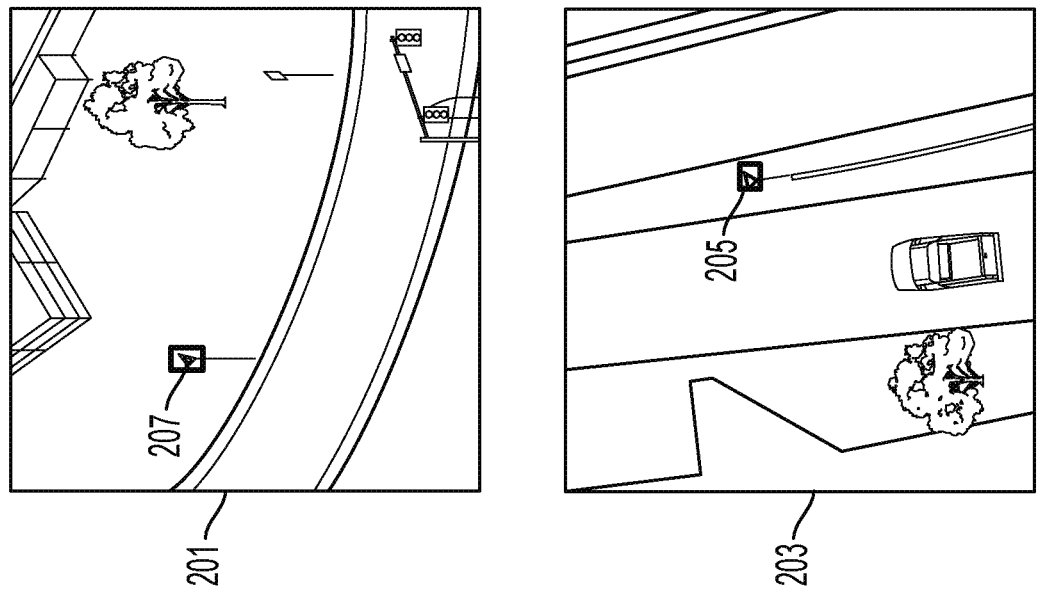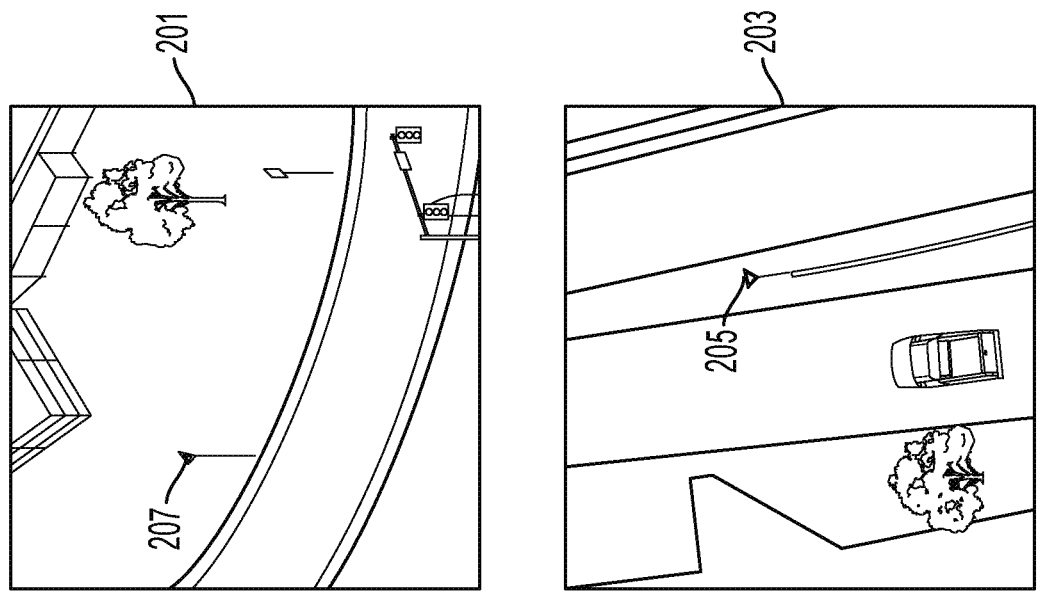
FIG. 18

SYSTEM AND METHOD FOR INTERSECTION MANAGEMENT BY AN AUTONOMOUS VEHICLE

CROSS REFERENCE TO RELATED APPLICATIONS

This application is a continuation of U.S. patent application Ser. No. 17/214,300, filed Mar. 26, 2021, to be issued as U.S. Pat. No. 11,927,455 on Mar. 12, 2024, which claims the benefit of U.S. Provisional Application Ser. No. 63/001,329, filed Mar. 28, 2020, which is incorporated herein by reference in its entirety.

BACKGROUND

The present teachings relate generally to travel through intersections, and specifically to autonomous travel through intersections.

To navigate an autonomous vehicle (AV) safely, it is necessary to cross intersections with care, accounting for traffic signs and signals, and avoiding obstacles, both mobile and static. Navigating intersections can be dangerous for any vehicle. According to a 2018 Department of Transportation study, almost a quarter of all fatal traffic accidents and almost 30% of non-fatal traffic accidents occur at intersections. It is thus necessary for the AV to determine when it is safe to proceed through an intersection and when it is not, based at least on traffic signs/signals and obstacles in and around the intersection. Any type of obstacle avoidance requires knowing the positions and movements of static and dynamic obstacles in the vicinity of the intersection. Adherence to traffic rules requires at least knowing the state of any traffic signals. For an AV that travels on both sidewalks and vehicular roadways, responding to differing traffic rules is required. In some situations, it might be necessary to reposition the AV to view the traffic signals to correctly determine their states.

User-operated vehicle drivers use cues such as lanes delineated by lines painted on a road, traffic lights indicating precedence at intersections, traffic signs, and pedestrian signs and signals. Autonomous perception systems can use these cues in real-time through the use of sensors, such as radar, camera, and LIDAR. These cues can be pre-recorded into a map that can be used to simplify and accelerate the work of the real-time systems. Traffic management features, annotated on the map, can be used to indicate when and where a vehicle should be able to see traffic management features. By using a map of traffic management features, the vehicle can predict when it should see traffic management features and respond appropriately, such as braking gradually to a stop. Using a map, the vehicle can predict a window where the traffic management feature, such as a stop light, could appear in a camera image.

To create the map, perception systems can use driving aids such as lines painted on roads, and can use alternative sensing modalities, such as radar or LIDAR, instead of vision, to locate and traffic management features. Traffic management features can include, but are not limited to including, vehicular traffic management features such as lights and signs, and pedestrian traffic management features such as lights and signs. Traffic management feature 3D position and orientation can be estimated from aerial and/or satellite imagery. To estimate traffic management feature altitude, a car can be driven through intersections and feature position can be estimated by triangulating multiple images.

What is needed are systems and methods that can enable an AV to navigate safely through vehicle and pedestrian intersections, determining the locations of traffic signals in advance of the navigation session, sensing the status of traffic signals, and acting accordingly.

SUMMARY

The intersection navigation system of the present teachings solves the problems stated herein and other problems by one or a combination of the features stated herein.

Systems and methods for navigating intersections autonomously or semi-autonomously can include, but are not limited to including, accessing data related to the geography of the intersection, executing autonomous actions to navigate the intersection, and coordinating with one or more processors and/or operators executing remote actions, if necessary.

Accessing data related to the geography of the intersection can include determining the locations of traffic signals. Identifying the locations of traffic signals is critical for determining the states of the signals. The method of the present teachings for traffic management feature identification from at least one oblique image can improve traffic signal identification. Oblique images can be used as part of a data set that can reduce data loss that is the result of, for example, sensor obstruction. For example, certain sensors can possibly be blind to features that are covered by vegetation, whereas sensors that might be positioned elsewhere can view the same features. One possibility is combining the view and data from ground-based sensors with the view and data from aerial sensors. Another possibility is combining the view and data from one perspective with a view and data from another perspective, perhaps a view of a subject taken from an oblique angle with respect to other views. One method for accomplishing viewing subjects such as traffic management features from different perspectives can include, but is not limited to including, determining a latitude/longitude of the corners of an aerial image region of interest from at least one aerial image, and determining an oblique image region of interest from the at least one oblique image based on the latitude/longitude. The method can include determining an estimated height of the traffic management feature, generating, based on a machine learning process, traffic management feature bounding box pixels for the traffic management features within the oblique image region of interest, and calculating coordinates of the traffic management feature based on a homography transform based on the estimated height and the traffic management feature bounding box pixels. The method can optionally include using a segmentation model to determine the latitude and longitude of the aerial region of interest, and discarding the traffic management features that are shorter than the estimated height. The traffic management features can optionally include traffic lights, traffic signs, pedestrian signals, and pedestrian signs. The oblique image region of interest can optionally include a traffic intersection and/or a highway merge.

In an alternative configuration, the system and method of the present teachings can detect traffic management feature positions using oblique images of intersections. The method can include analyzing aerial images to determine the locations of intersections. The analysis can be performed using a segmentation model. The intersection locations can be used to locate regions of interest within oblique images. These regions of interest can be provided, along with estimated heights of the traffic management features of interest to a machine learning algorithm to pick out possible features. Features that are shorter than the estimated height of the traffic management feature of interest can be discarded. A homography transform can be used to calculate the coordinates of the traffic management features of interest based on the traffic management feature bounding box pixels and the estimated height.

When navigating an intersection, an autonomous vehicle (AV) can be traveling autonomously, executing autonomous actions, in a particular traffic lane. The AV can become aware of an upcoming intersection, and can begin to take various possibilities into account. The list of possibilities provided herein can be reduced or expanded, depending upon desired behavior of the AV and possible associated remote systems. Ultimately, if the AV is under autonomous control, the AV can distinguish between different classes of intersections and take action based upon the classification. For example, if the intersection is signed, the AV can use various strategies for navigation. Alternatively, if the intersection is signaled, another set of strategies can be used. If the intersection is a signaled road intersection versus a signaled pedestrian intersection, different strategies can be used. The system of the present teachings is flexible enough that adding various navigation strategies is possible. Further, other users of the roadways may require the AV to execute special strategies. For example, static and dynamic objects can be avoided during navigation through an evaluation of the time period-based persistence of the objects in the intersection, and an evaluation of the influence of object presence from one time period to the next.

BRIEF DESCRIPTION OF THE DRAWINGS

The present teachings will be more readily understood by reference to the following description, taken with the accompanying drawings, in which:

FIG. 5I is a graph of obstacle weighing factors with respect to speed of obstacles in an intersection and the distance between the obstacles and the AV;

FIGS. 6A and 6B are pictorial representations of possible obstacle positioning in intersections;

FIG. 10 is an image representation of the bounding boxes of traffic management features of the present teachings;

FIG. 11 is an image representation of the oblique images of intersections and traffic management features of the present teachings;

FIG. 12 is an image representation of the bounding boxes of the traffic management features of FIG. 11;

FIG. 13 is an image representation of the oblique images of intersections with pedestrian management features of the present teachings;

FIG. 14 is an image representation of the bounding boxes of the pedestrian management features of FIG. 13;

FIG. 15 is an image representation of the oblique images of one type of traffic sign management features of the present teachings;

FIG. 16 is an image representation of the bounding boxes of the traffic sign management features of FIG. 15;

FIG. 17 is an image representation of the oblique images of another type of traffic sign management features of the present teachings;

FIG. 18 is an image representation of the bounding boxes of the traffic sign management features of FIG. 17;

DETAILED DESCRIPTION

The intersection navigation system of the present teachings relates to autonomous vehicular travel. However, various types of applications may take advantage of the features of the present teachings.

Systems and methods for navigating intersections autonomously or semi-autonomously can include, but are not limited to including, an autonomous vehicle (AV) executing autonomous actions, coordinating with one or more processors and/or operators executing remote actions, if necessary. As a starting point to the description of intersection navigation, the AV can be traveling autonomously, executing autonomous actions, in a particular traffic lane. The AV can become aware of an upcoming intersection, and can begin to take various possibilities into account. The list of possibilities provided herein can be reduced or expanded, depending upon desired behavior of the AV and associated remote systems. Ultimately, if the AV is under autonomous control, the AV can distinguish between different classes of intersections and take action based upon the classification. For example, if the intersection is signed, the AV can use various strategies for navigation. Alternatively, if the intersection is signaled, another set of strategies can be used. If the intersection is a signaled road intersection versus a signaled pedestrian intersection, different strategies can be used. The system of the present teachings is flexible enough that adding various navigation strategies is possible. Further, other users of the roadways may require the AV to execute special strategies. For example, static and dynamic objects can be avoided during navigation through an evaluation of the time period-based persistence of the objects in the intersection, and an evaluation of the influence of object presence from one time period to the next.

Figure 1A:
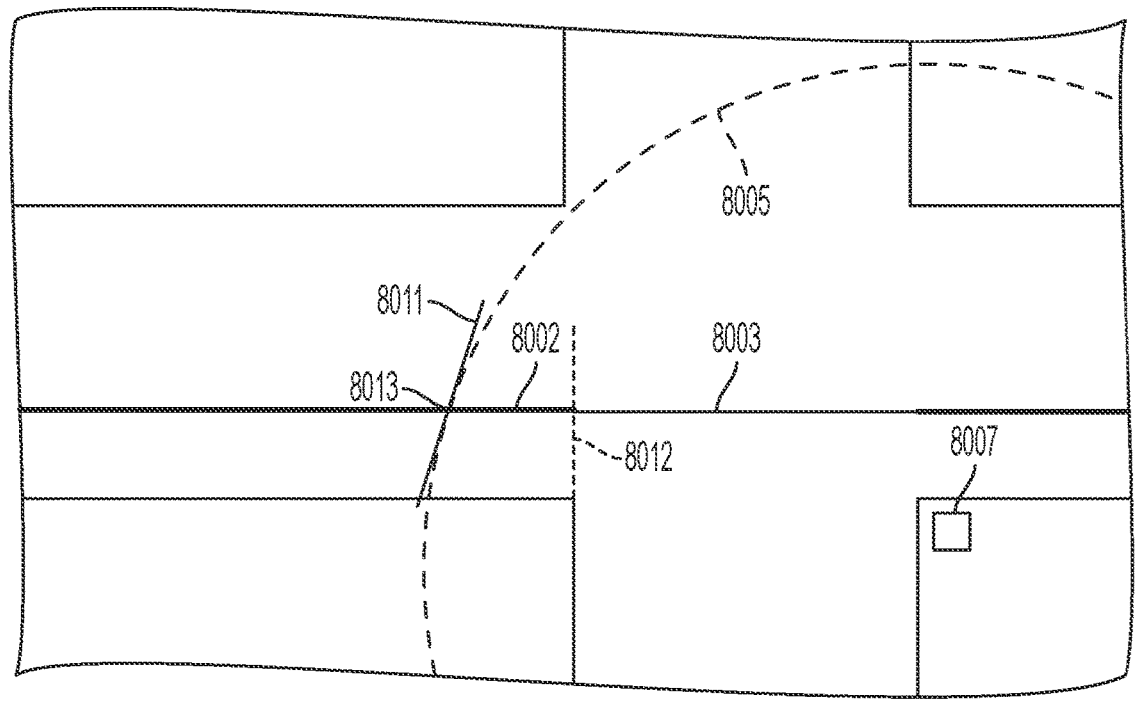
FIGS. 1A and 1B, 2 and 3 are pictorial representations of the intersection definitions applicable to the present teachings.
Figure 1B:
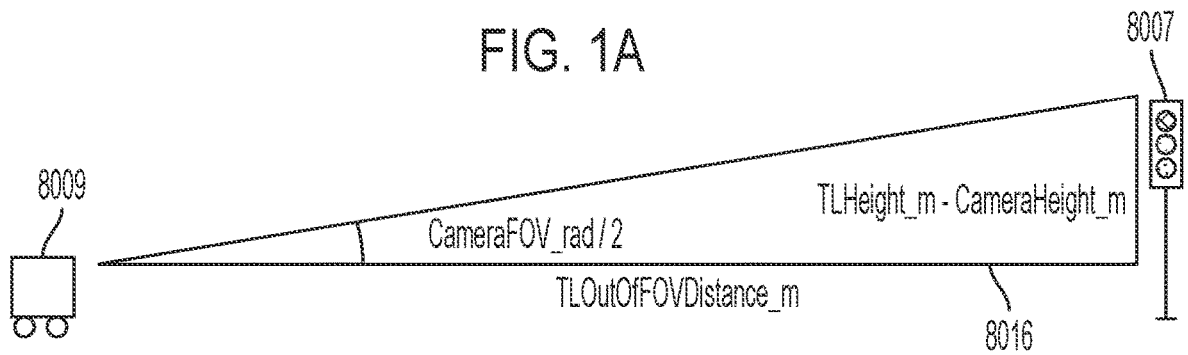

Referring now to FIG. 1A, to provide a basis for understanding the issues with autonomous intersection navigation, terminology relevant to the description is introduced herein. The terminology is not intended to limit the scope of the present teachings, but simply to provide a means to refer to aspects of an intersection as shown in FIGS. 1A and 1B. Intersection 8003 can include intersection entry line 8012 and traffic light 8007, for example. Stop line 8011 is the position that the AV can reach to make a decision, referred to herein as a go/no-go decision, about whether or not to enter intersection 8003. Safe intersection navigation can be dependent upon determining stop line 8011 for intersection 8003, and providing real-time information about the location of stop line 8011 relative to moving AV 8009 (FIG. 1B). In some configurations, the locations of intersection 8003, the traffic control devices, such as, for example, but not limited to, traffic light 8007, located at intersection 8003, geometry of intersection 8003, the limits of perception associated with AV 8009 (FIG. 1B), and fiducials related to intersection 8003 can be known in advance of arrival of AV 8009 (FIG. 1B) at intersection 8003. With these known values and possibly other known or measured values, the location of stop line 8011 can be determined in real-time, for example. In some configurations, all parameters can be determined in real-time. Perception range 8005 around AV 8009 (FIG. 1B) that defines the area from where traffic light 8007 can possibly be seen by AV 8009 (FIG. 1B), referred to herein as the minimum perception range, can be determined based on known information. The minimum perception range is the closest distance at which traffic light 8007 can be detected, and is a function of the height of traffic light 8007, the field of view of the camera on AV 8009 (FIG. 1B) that is detecting traffic light 8007, and the distance between traffic light 8007 and AV 8009 (FIG. 1B). Stop line 8011 can be determined by locating line 8002 between intersection entrance point 8012 and perception range 8005, and drawing tangent line 8011 to perception range 8005 at meeting point 8013 of line 8002 and perception range 8005. Intersection entrance point 8012 can be known in advance, for example, from historical mapping data. An optimum stop line 8011 based on the location of intersection entrance 8012 can be determined. If intersection 8003 includes a traffic signal such as, for example, traffic light 8007, stop line 8011 and intersection entrance point 8012 can be coincident. Stop line 8011 can be as close as intersection entrance 8012 to traffic light 8007, but not closer. If intersection 8003 includes a traffic sign, for example, stop line 8011 and intersection entrance 8012 are co-located. If the path the AV is taking requires the AV to travel from a sidewalk to another surface, stop line 8011 can include a discontinuous surface feature such as, but not limited to, a curb. In such cases, stop line 8011 can be determined to lie on the destination surface side of the discontinuous surface feature if there is not a feature that allows traversal of the discontinuous surface feature without navigating the discontinuous surface feature, such as, for example, but not limited to, a curb cut. Other curb cut determinations are contemplated by the present teachings.

Referring now to FIG. 1B, if AV 8009 is on or inside perception range 8005 (FIG. 1A), AV 8009 may be too close to traffic light 8007 to see traffic light 8007, and the location of stop line 8011 (FIG. 1A) can be deemed irrelevant for this scenario. If AV 8009 is outside of perception range 8005 (FIG. 1A), stop line 8011 (FIG. 1A) can be drawn based upon meeting point 8013 (FIG. 1A), tangent to perception range 8005 (FIG. 1A), so that the orientation of stop line 8011 (FIG. 1A) faces traffic light 8007 for optimal visibility. If perception range 8005 (FIG. 1A) has a radius such that meeting point 8013 (FIG. 1A) falls inside intersection 8003 (FIG. 1A), stop line 8011 (FIG. 1A) can be set to intersection entry 8012 (FIG. 1A). In some configurations, calculating the radius 8016 of perception range 8005 (FIG. 1A) can include determining the field of view of a sensor associated with AV 8009, the height of the sensor taken, for example, at the midpoint of the sensor, and the height of the signal taken, for example, at the top of the signal. Radius 8016 can be calculated according to the following:

$$\text{Radius} = (\text{height of signal} - \text{height of sensor})/(\tan(\text{sensor field of view(radians)}/2)$$

In some configurations, the sensor can include a camera mounted on the directionally-forward facing side of AV 8009. Other sensor options are contemplated by the present teachings. The signal can include a road signal or a pedestrian signal, for example.

Figure 2:
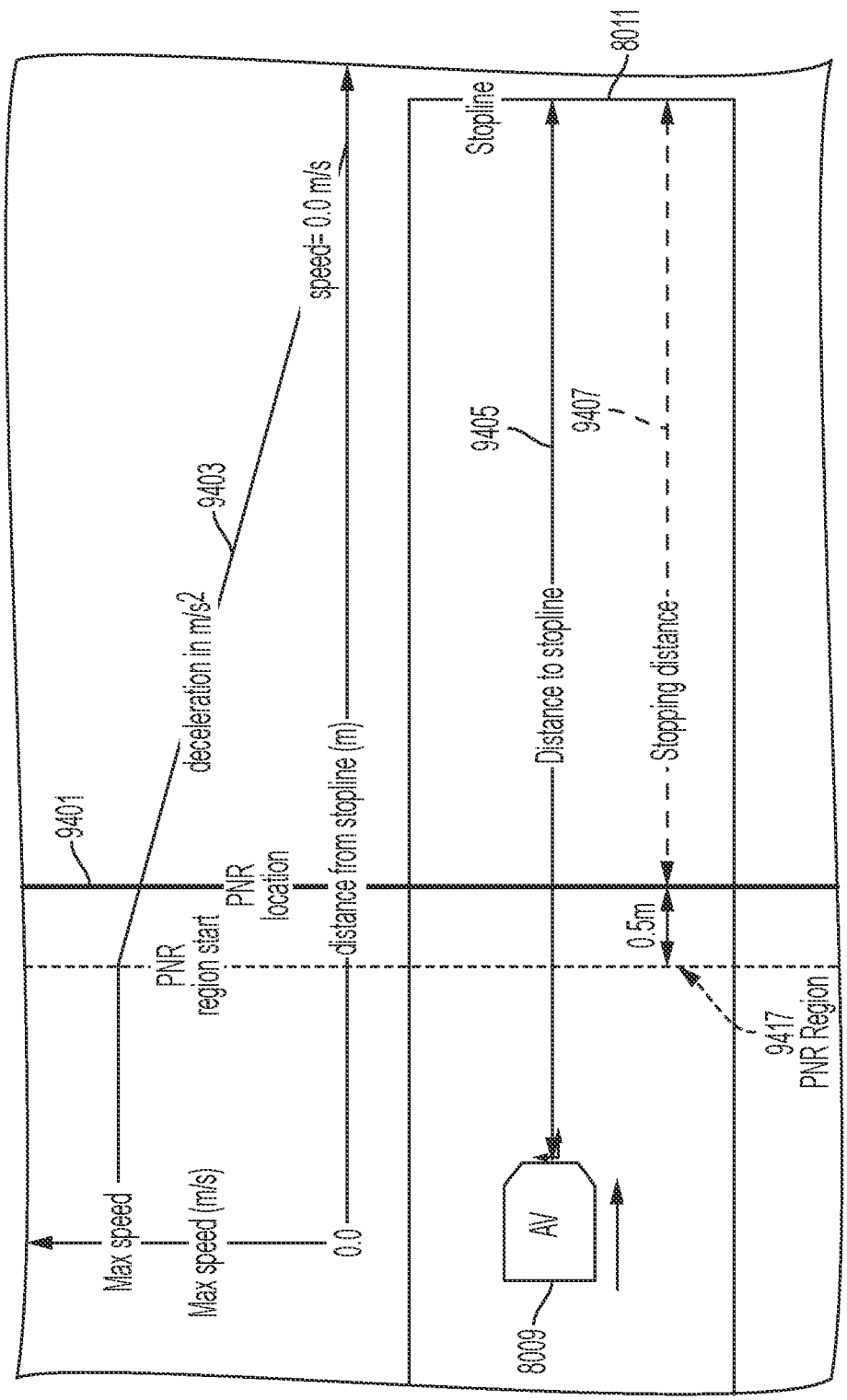

Referring now to FIG. 2, in general, given distance 9405 to stop line 8011, as AV 8009 moves, the location of point of no return (PNR) 9401 can be calculated. The purpose of PNR 9401 is to allow smooth stops at stop line 8011 whenever possible. PNR 9401 is a point between intersection entrance point 8012 (FIG. 1A) and stop line 8011. PNR 9401 can fall anywhere between the maximum perception range and stop line 8011. When AV 8009 is at stop line 8011, PNR 9401 is collocated with stop line 8011. PNR 9401 is a point relative to stop line 8011 where, if the brakes are applied, AV 8009 comes to a stop before stop line 8011, thereby avoiding breaching stop line 8011 and allowing smooth stops at stop line 8011. PNR 9401 is a function of the current speed of AV 8009. PNR 9401 is the point behind or at stop line 8011 whose distance 9405 to stop line 8011 is equal to braking distance 9407 of AV 8009 at the current speed. PNR 9401 can include range or area 9417, for example, within 0.5 m from PNR 9401. Any PNR-related speed adjustment thus begins in PNR 9401 range before AV 8009 reaches the actual PNR. If AV 8009 arrives at PNR region 9417, a braking sequence can begin as the application of a deceleration to the current speed. The underlying objective of PNR 9401 is to prevent AV 8009 from abruptly stopping/suddenly breaking/hard stopping as much as possible. The location of PNR 9401 is situated at a breaking distance behind stop line 8011 such that if deceleration 9403, such as, for example, but not limited to, a pre-selected deceleration of $-0.5$ m/s$^2$ to $-3.1$ m/s$^2$, is applied to the speed of AV 8009 at PNR 9401 iteratively as AV 8009 travels, AV 8009 can come to a stop at stop line 8011. Thus, PNR 9401 varies with the current speed of AV 8009. A traffic signal can change abruptly to yellow/red/unknown when AV 8009 is close to stop line 8011, making a hard stop the right choice to preserve the safety of AV 8009 and others sharing the travel way. In some configurations, $$\begin{aligned}\text{Braking distance} &= \text{distance (in meters) between PNR 9401} \\ &\quad \text{and stop line 8011} \\ &= -(\text{current speed of AV 8009 (in m/s)})^2 \Big/ \\ &\quad (2.0 * \text{deceleration rate (in m/s}^2))\end{aligned}$$

where the deceleration rate can be determined based on pre-selected criteria. PNR 9401 is evaluated as a region to ensure that AV 8009 recognizes that it is at PNR 9401 so that AV 8009 can start braking before reaching PNR 9401 region. PNR 9401 region can begin at about 0.5 m ahead of the actual PNR location. The speed is altered based on AV's location relative to PNR 9401 as shown in Table I. The reduced speeds are calculated as follows:

$$\text{MMS}(t) = \max(0.0, \text{MMS}(t - \Delta T) - (\text{Deceleration} * \Delta T))$$

where manager max speed (MMS) in the first speed reduction cycle is equivalent to the speed of AV 8009 at time t. In subsequent iterations, the speed can be reduced at the rate of deceleration in m/s$^2$ over the time $\Delta T$ that elapses between two consecutive pre-selected time periods.

Figure 3:
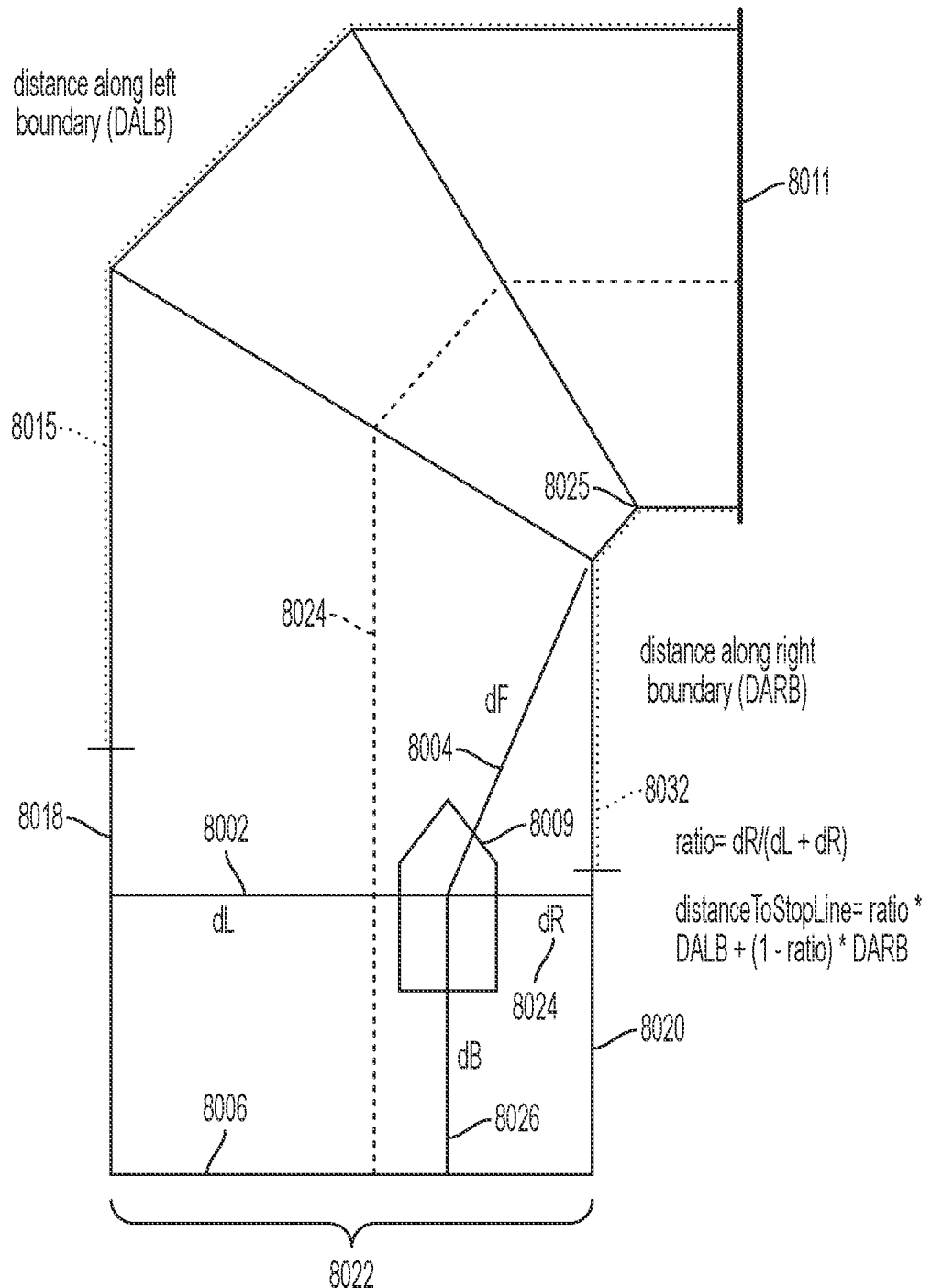

Referring now to FIG. 3, when a slowdown is needed, a distance to stop line 8011 is needed. As AV 8009 travels in lane 8022, regardless of where AV 8009 travels with respect to way 8024, several parameters can be accessed and/or determined. In some configurations, bottom boundary 8006 can be deduced from left boundary 8018 and right boundary 8020, which can be determined based on historical map data, for example. As can be seen in FIG. 3, when the lane includes a turn, distance 8015 is longer than distance 8032, because the distances represent the minimum and maximum of the length of lane 8022. Knowing the current location of AV 8009 and the other map parameters described herein, dF 8004 (shortest distance between AV 8009 and a front border), dL 8002 (the distance between AV 8009 and left lane border 8018, dR 8024 (the distance between AV 8009 and right lane border 8020, and dB 8026 (the distance between AV 8009 and bottom border 8006) can be computed. These calculations can be used to compute the distance to stop line 8011 as a weighted average of the distance along left boundary 8018 and the distance along right boundary 8020.

For example, the distance to stop line 8011 from the shown position of AV 8009 can be computed as follows:

$$\text{Ratio} = dR / (dL + dR)$$

$$\text{Distance} = \text{ratio} * \text{distance } 8015 + (1 - \text{ratio}) * \text{distance } 8032$$

Continuing to refer to FIG. 3, before reaching PNR 9401, AV 8009 continues traveling at the maximum speed for the situation. When PNR 9401 is reached, a deceleration can be applied to the speed of AV 8009 until the actual or virtual stop line, when the maximum speed is set to 0.0 m/s or a decreasing speed according to a deceleration in the range of, for example, $-3.1$ m/s$^2$ to $-0.5$ m/s$^2$. The following table lists the actions AV 8009 takes under some of the circumstances described herein.

TABLE I

| AV location | Signal/sign | Qualifier | Processing | Published speed |
|---|---|---|---|---|
| Behind PNR | Signal | Green/Red/Yellow/unknown | Continue traveling at initial max speed | 1. Max speed |
| At/Past PNR | Signal | 1. Green<br>2. Red/Yellow/Unknown | 1. Proceed to stop line at max speed<br>2. Go to stop line @ deceleration rate, continuously make go/no-go decision based on TL status | 1. Max speed<br>2. decelerating speed @ -0.5 m/s$^2$ until 0.0 m/s speed @ stop line |
| At stop line | Signal | 1. Green<br>2. Red/Yellow<br>3. Unknown | 1. Go decision @ max speed<br>2. No-go decision, stop, wait for TL status change<br>3. No-go decision, stop, wait $\Delta t$ to reach known state, if no known state @ $\Delta t$, call RC (e.g. $\Delta t$ = 8 secs) | 1. Max speed<br>2. 0.0 m/s<br>3. 0.0 m/s |
| Behind PNR | Sign | 1. Stop<br>4. Yield<br>5. Virtual stop/yield sign<br>6. ROW | 1-6. Proceed @ max speed | 1-5. decelerated speed @ -0.5 m/s$^2$<br>6. max speed |
| At/Past PNR | Sign | 1. Stop<br>4. Yield<br>5. Virtual stop/yield sign<br>6. ROW | 1-5. Continue deceleration<br>6. proceed @ max speed | 1-5. decelerated speed @ -0.5 m/s$^2$<br>6. max speed |
| At stop line | Sign | 1. Stop<br>4. Yield<br>5. Virtual stop/yield sign<br>6. ROW | 1-5. stop, wait 5 seconds, then start 20-second window process, apply persistence to go/no-go, or call RC<br>6. proceed @ max speed | 1-5. decelerated speed @ -0.5 m/s$^2$<br>6. max speed |

Figure 4:
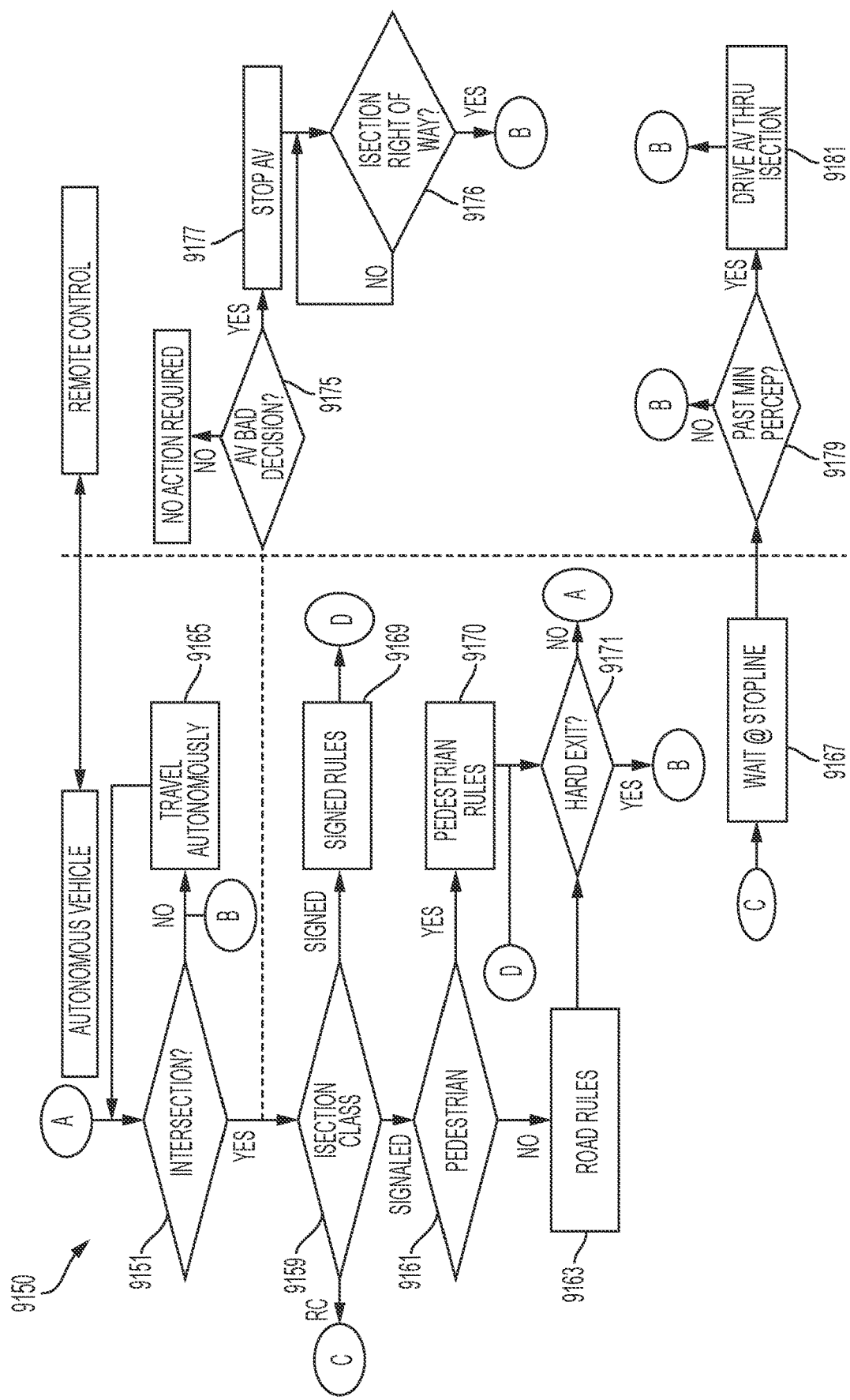
FIG. 4 is a schematic block diagram of autonomous and remote handshaking of one configuration of the present teachings.

Referring now to FIG. 4, the AV can travel autonomously until encountering an intersection, for which the intersection navigation processes described herein are invoked. When the intersection navigation processes are invoked, and possibly throughout navigation of the intersection, the processes are provided, for example, but not limited to, the lane of travel, the traffic light state, a maximum speed, dynamic and static obstacle presence, and a current stop line. The lane information and obstacles can be used to help the intersection navigation processes determine whether remote assistance might be needed to traverse the intersection. The maximum speed, traffic light state, and the current stop line can be used by the intersection navigation processes to carry out rules associated with various classes of intersections. Intersection classes can include signed, signaled, and remotely-controlled. When the AV approaches a current stop line, the AV determines what class of intersection is being encountered, for example, by evaluating information provided to the AV. Signed intersections can include right of way, stop, rolling stop, and yield, for example. Signaled intersections can include traffic light and pedestrian light intersections, for example. Remotely-controlled intersections can include unknown types of intersections. When the AV determines that an intersection is coming up in its navigation path, if the AV is not under remote control at or in the intersection, the AV begins intersection navigation processing based upon the intersection classification. Signal types traffic light and pedestrian light are processed according to road traffic light and pedestrian traffic light rules, respectively. Signed types right of way, stop, rolling stop, and yield are processed according to signed intersection rules. These processing steps can be interrupted by a hard exit, for example, but not limited to, by a route recomputation, or if the current stop line has stop lines have been processed. An upcoming intersection's stop line can be encountered after reaching the minimum perception range of the current intersection. The AV processes the current one before processing the upcoming intersection's stop line.

Continuing to refer to FIG. 4, in some configurations, when an AV is expected to cross traffic intersections, the AV can come to a complete stop and alert a remote control processor. The remote control processor can confirm that there is sufficient cellular signal that the processor does not expect the cellular signal to be dropped and, at some types of intersections, can drive the AV across the intersection. At some types of intersections, the AV can plan a path across the intersection and drive across autonomously. The intersections in which the AV can cross autonomously can include, but are not limited to including, traffic lights (pedestrian and road) with or without crosswalks, 4-way stop signs, 2-way stop signs, yield signs, and virtual rights-of-way.

Continuing to refer to FIG. 4, situations that can be accommodated by an implementation of the system of the present teachings can include, but are not limited to including, invalid or possibly invalid perception data gathered by the AV, difficult intersections, obstacles in the intersection, complex intersections, and AV orientation issues. With respect to invalid or possibly invalid perception data, the system of the present teachings can transfer control to the remote system which can stop the AV, for example, but not limited to, when it is detected that the AV is making an incorrect decision based on invalid data, for example. Other responses to possibly invalid perception data are contemplated, including repositioning the AV and/or executing internal filtering and correction instructions. If the remote system is invoked, the remote system can stop the AV at the current stop line. When it is believed that the data received by the AV are correct, and the intersection is safe to cross, autonomous control can be returned to the AV. If the AV has crossed the line that represents the perception range minimum mark, also referred to herein as the distance from the current stop line, and a stop request is sent from the remote system to the AV, control can remain with the remote system until the AV is no longer in the intersection. When it is known in advance that an intersection will be too difficult to autonomously traverse, for example, but not limited to, a railroad crossing, the AV can wait at the current stop line and call for remote assistance to determine if the intersection is safe to traverse. If there is a large number of obstacles in an intersection, the AV can request transfer of control to the remote system that can determine whether or not the intersection is safe for traversal. When the remote system determines that the intersection is clear, or at least safe, the remote system can return autonomous control to the AV. When it is known in advance that the AV will enter a complex intersection, the AV can transfer control to the remote system until the remote system drives the AV through the intersection. Such a complex intersection might include a left turn intersection. When it is known that a curb cut between a sidewalk and a crosswalk does not face a pedestrian traffic light, the AV can spin at the stop line to put the pedestrian traffic light within the field of view of the AV. The spin can take place if the AV is not within a pre-selected field of view of the pedestrian traffic light, for example, but not limited to, 40°. When the spin is complete, the AV can wait a pre-selected amount of time to achieve stability from the spin action, and can then detect the traffic light state and act accordingly. The AV can spin itself, for example, according to U.S. patent application Ser. No. 17/214,045, entitled System and Method for Navigating a Turn by an Autonomous Vehicle, filed concurrently with the present application and incorporated in its entirety by reference.

Continuing to still further refer to FIG. 4, in one implementation of the system of the present teachings, method 9150 can include a handshaking protocol between autonomously-navigating AV systems and remote systems/personnel, referred to herein collectively as remote control processors. If 9151 the AV is not approaching an intersection, method 9150 can include continuing 9165 to travel autonomously and continue 9151 being on the lookout for an intersection. If AV is approaching an intersection, and if 9175 the remote control processor notices that the decision being made is not consistent with the desired behavior of the AV, then the remote control processor sends 9177 a stop command to the AV. In some configurations, no transfer of control from the AV to the remote control processor is required when the remote control processor suspects that the AV will make an inconsistent decision. Likewise, no transfer of control from the remote control processor to the AV is required if the remote control processor finds that the actions the AV is taking are consistent. If the remote control processor has taken over, the AV waits at the current stop line until the remote control processor can transfer control to the AV. If 9176 the AV has the right of way at the intersection, the remote control processor can transfer control to the AV so that the AV can once again travel autonomously 9165. If 9176 the AV does not have the right of way at the intersection, the remote control processor can retain control of the AV until the AV has the right of way. If 9151 the AV is approaching an intersection and the remote control processor has not intervened, and if 9159 the intersection is classified as one that requires remote control, i.e. autonomous travel is not possible, based on considerations such as whether or not the route that the AV is taking requires a left hand turn through the intersection, method 9150 can include stopping 9167 the AV at the current stop line and transferring control to the remote systems. If 9179 the AV has passed the minimum perception line with respect to the stop line, method 9150 can include sending 9181, by the remote systems, commands to the AV to drive through the intersection, under the control of the remote systems, and then, when the intersection traversal is complete, returning control to the AV systems. If 9179 the AV has not passed the minimum perception line, method 9150 can include returning autonomous control to the AV. If 9159 the intersection falls into the classification of signed intersections, method 9150 can include following 9169 rules for signed intersections, and if 9171 a hard exit is received, method 9150 can include returning to autonomous travel 9165. If 9171 a hard exit is not recognized, method 9150 can include continuing to test if the AV is approaching an intersection. If 9159 the intersection falls into the classification of signaled intersections, and if 9161 the intersection falls into the classification of a pedestrian intersection, method 9150 can include following 9170 rules for signaled pedestrian intersections, and if 9171 a hard exit is received, method 9150 can include returning to autonomous travel 9165. If 9161 the intersection falls into the classification of a road intersection, method 9150 can include following 9163 rules for signaled road intersections, and if 9171 a hard exit is received, method 9150 can include returning to autonomous travel 9165.

Referring now to FIGS. 5A-5I, an implementation of the autonomous navigation of the present teachings can include exemplary methods for processing various situations that the AV can encounter when navigating an intersection. Variations of the exemplary methods of intersection navigation of the present teachings are contemplated and covered by the present description.

Figure 5A:
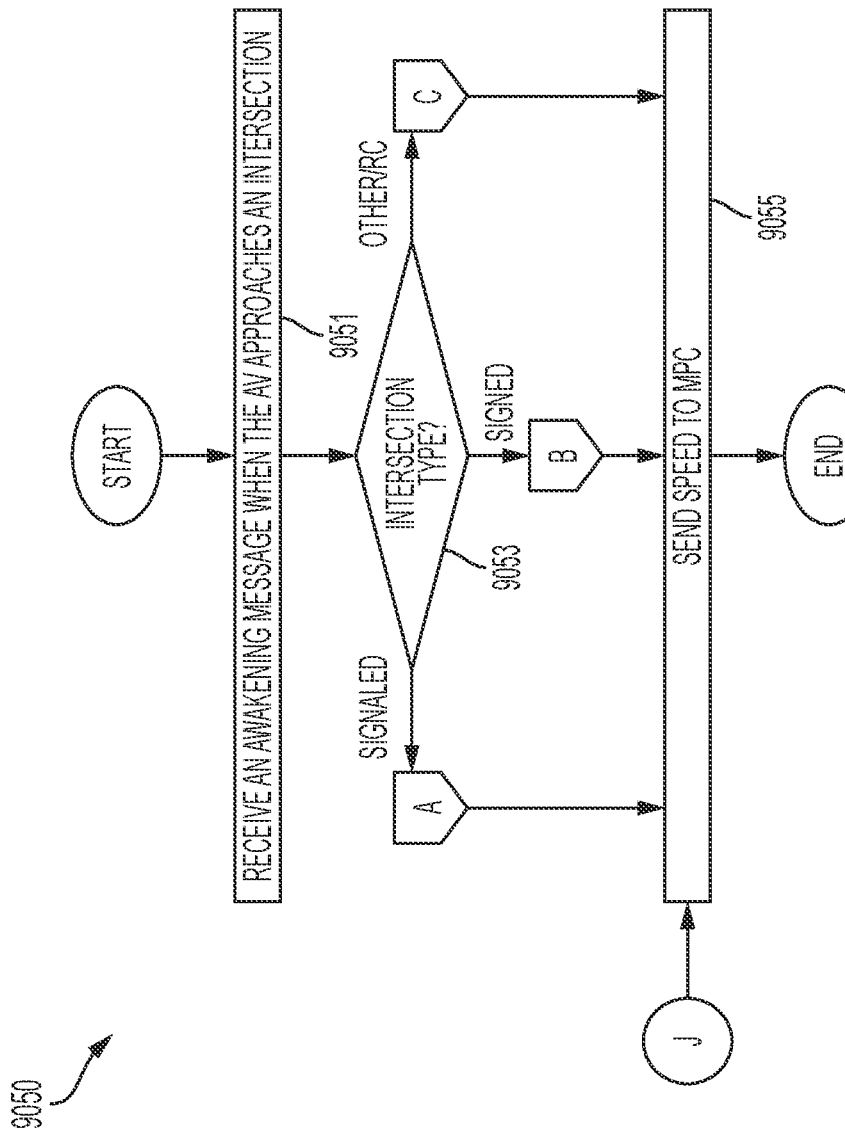
FIGS. 5A-5H are flowcharts of the method of the present teachings.

Referring now to FIG. 5A, method 9050 sets out an implementation of the method of the present teachings. The description is not intended to be limiting and other features and processing steps are contemplated by the present teachings. Method 9050 for navigating an intersection can include, but is not limited to including, receiving 9051 an alert that an intersection is expected in the travel path. If 9053 there is a traffic sign at the intersection, method 9050 can include executing steps to navigate the AV through a signed intersection. If 9053 there is a traffic signal at the intersection, method 9050 can include executing steps to navigate the AV through a signaled intersection. If 9053 the type of intersection is unknown or if the AV is under remote control, method 9050 can include executing steps to navigate the AV through an unknown type of intersection. The type-specific processing provides the speed at which the AV should travel under the circumstances of the intersection type. When type-specific processing is complete, method 9050 can include sending 9055 the speed value to a controller that can direct the AV to travel at the desired speed through the intersection. At the completion of sending the speed to the controller, method 9050 can include awaiting receiving notification of another intersection in the travel path.

Figure 5B:
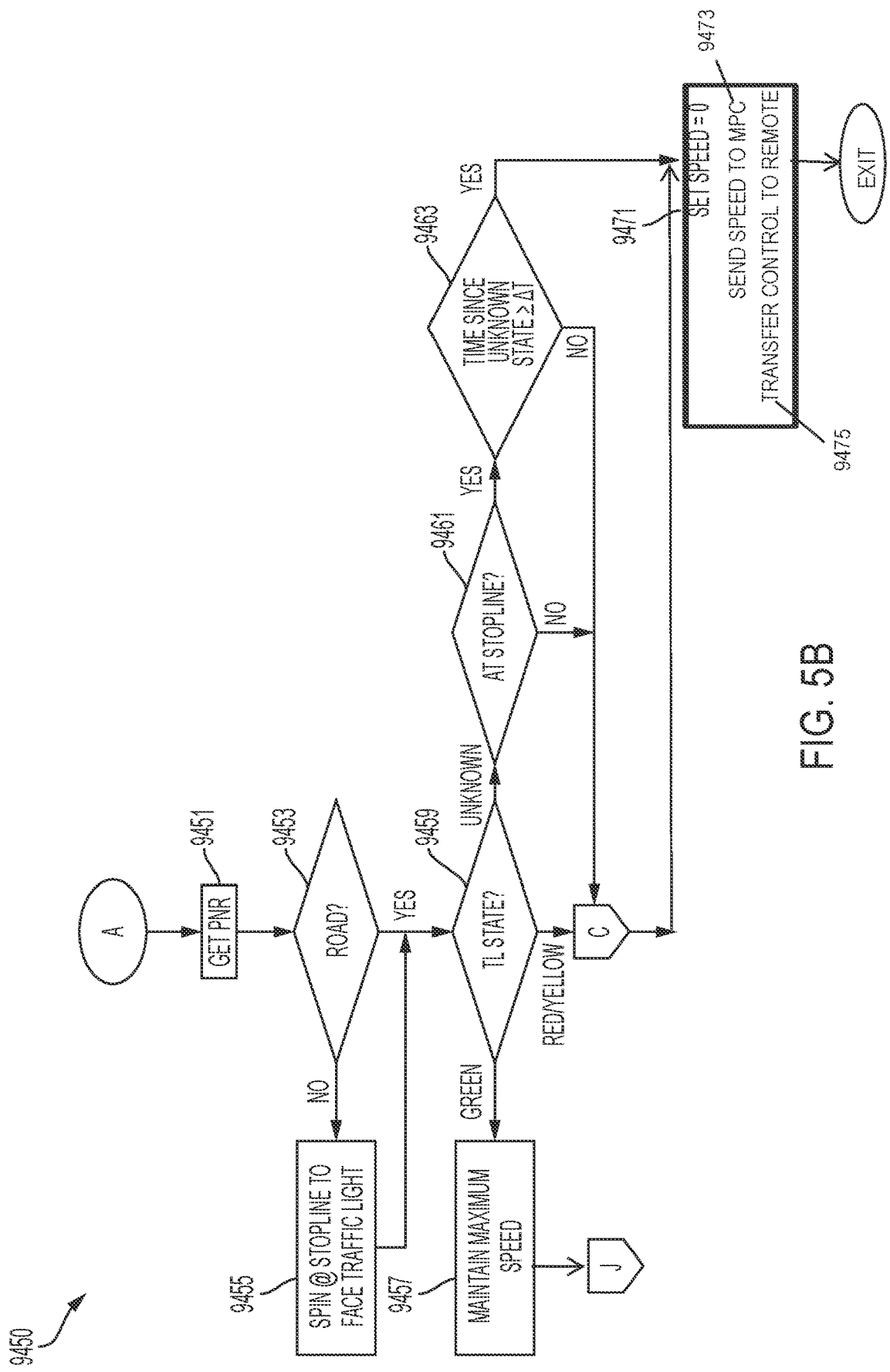

Referring now to FIG. 5B, when the AV is approaching an intersection that includes a traffic signal, an implementation of the present teachings can include processing steps specific to the signaled intersection. Other implementations are contemplated. Method 9450 for navigating a signaled intersection can include, but is not limited to including, determining 9451 a point of no return (PNR), for example, as described herein, or through other methods. If 9453 the AV is not traveling on a road, method 9450 can include spinning 9455 the AV at the stop line to face a traffic light so that the AV can get a clear view of the state of the light. If 9453 the AV is traveling on a road, or when the AV has spun to face the traffic light, and if 9459 the traffic light state is green, method 9450 can include setting 9457 the speed to the maximum speed for the road type, and sending 9055 (FIG. 5A) the speed to the speed controller for the AV. If 9459 the traffic light state is unknown, and if 9461 the AV is at a stop line supplied to the AV based on current travel criteria, and if 9463 the time that the traffic light has been in an unknown state is greater than or equal to a pre-selected amount of time, method 9450 can include setting 9471 the speed of the AV to zero, sending 9473 the speed to the speed controller for the AV, and transferring 9475 control to remote control to request a checkin. If 9459 the traffic light state is unknown, and if 9461 the AV is not at the stop line, method 9450 can include calculating reduced speed of the AV based on the location of the PNR, and sending 9055 (FIG. 5A) the speed to the speed controller for the AV. If 9459 the traffic light state is unknown, and if 9461 the AV is at the stop line, and if the time that the traffic light has been in an unknown state is less than a pre-selected amount of time, method 9450 can include reducing the speed of the AV to 0.0 m/s, sending 9473 the speed to the speed controller for the AV, and transferring 9475 control to remote control. If 9459 the traffic light state is red/yellow, and if 9253 the AV has reached the PNR, method 9250 (FIG. 5D) can include calculating 9255 (FIG. 5D) a speed reduction based on the PNR, and sending 9055 (FIG. 5A) the speed to the speed controller for the AV. Otherwise, method 9250 (FIG. 5D) can include setting 9257 (FIG. 5D) the speed of the AV to the maximum speed for the situation and sending 9055 (FIG. 5A) the speed to the speed controller for the AV.

Figure 5C:
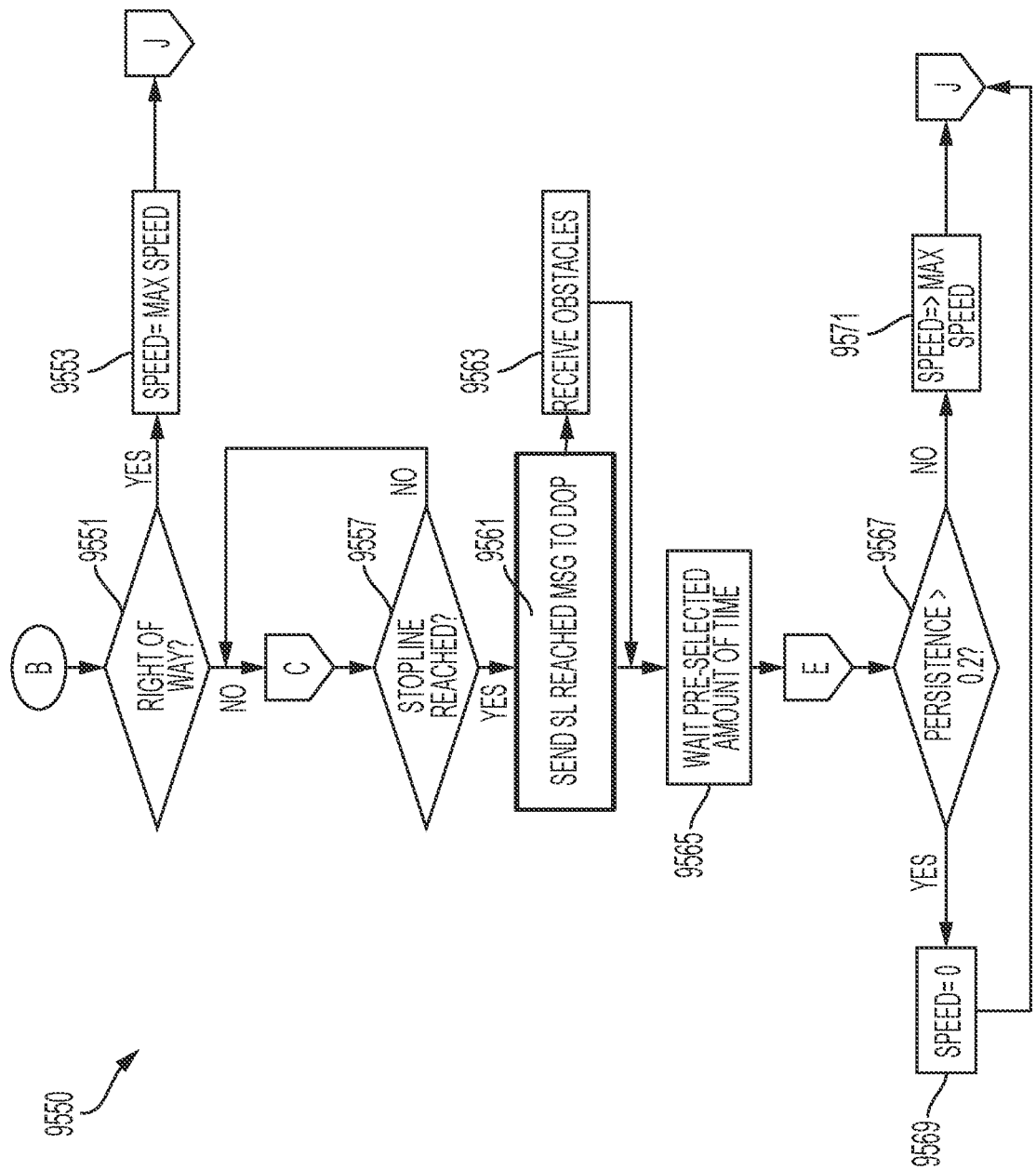
Figure 5D:
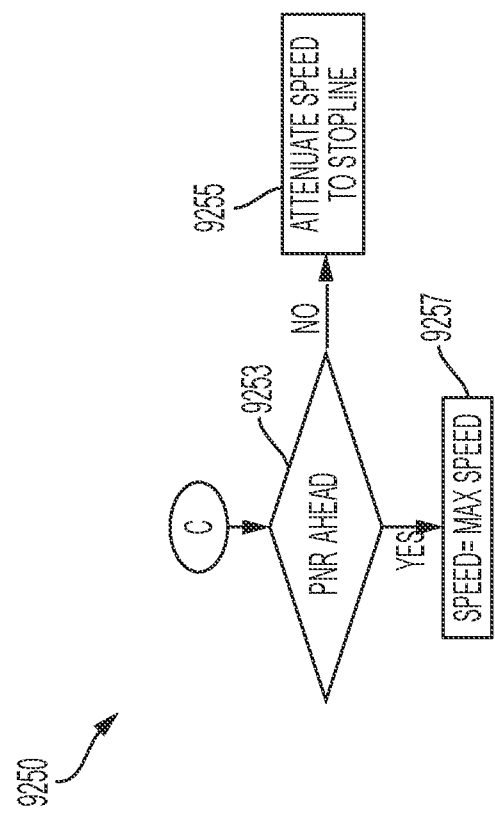

Referring now to FIG. 5C, if 9053 (FIG. 5A) there is a traffic sign at the intersection, and if 9551 the AV has the right of way at the intersection, method 9550 can include setting 9553 the speed to the maximum speed for the situation and sending 9055 (FIG. 5A) the speed to the speed controller for the AV. If 9551 AV does not have the right of way, and if 9253 (FIG. 5D) the AV has reached a PNR, method 9250 (FIG. 5D) can include setting 9255 (FIG. 5D) the speed of the AV to a decreasing value until the stop line is reached, and sending 9055 (FIG. 5A) the speed to the speed controller for the AV. If 9551 AV does not have the right of way, and if 9253 (FIG. 5D) the AV has not reached the PNR, method 9250 can include setting 9257 (FIG. 5D) the speed of the AV to the maximum value for the situation, and sending 9055 (FIG. 5A) the speed to the speed controller for the AV. If 9557 the AV has not reached the stop line, method 9550 can include returning to method 9250 (FIG. 5D) to determine if a PNR lies ahead in the travel path or has been reached. If 9557 the AV has reached the stop line, method 9550 can include sending 9561 a stop line reached message to a dynamic obstacle processor, receiving 9563 the locations of the obstacles, and waiting 9565 at the stop line for a pre-selected amount of time. In some configurations, the pre-selected amount of time is 5 seconds. Other wait times are possible. If 9557 the AV has reached the stop line, and if 9561 there are no obstacles in the intersection, method 9550 can include waiting 9565 at the stop line for a pre-selected amount of time and then managing the situation in which there are no obstacles in the intersection.

Figure 5E:
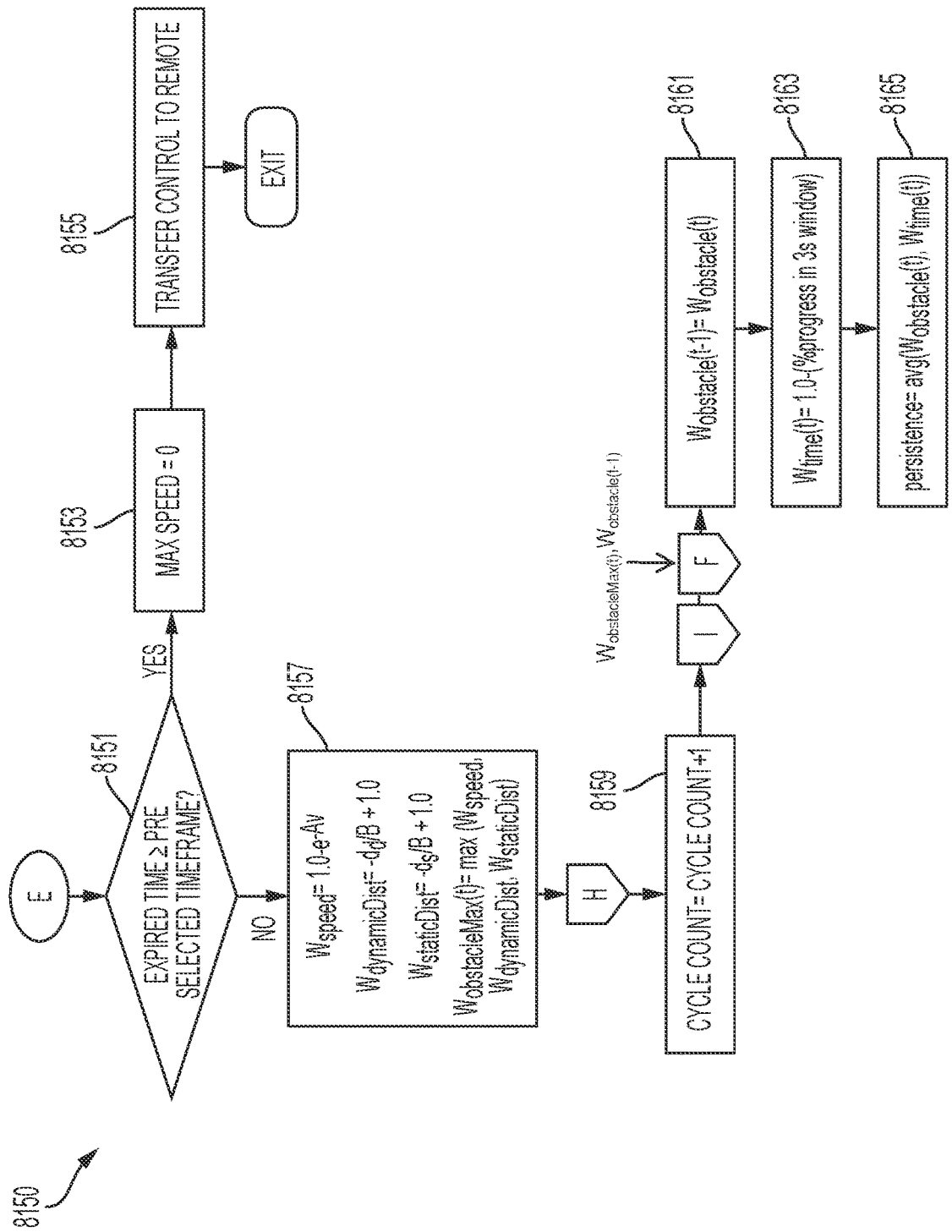

Referring now to FIG. 5E, managing a signed (virtual or physical) intersection in which there might be obstacles in the intersection can require that the AV avoid encountering obstacles in its projected path. Virtual traffic signs can be designated in areas where there may not be a physical sign, but the situation might require processing similar or identical to the processing required when a physical sign is present at the intersection. Navigating the intersection with or without obstacles involves deciding whether to enter the intersection based upon factors including the obstacles in the intersection. In an actual traffic situation, the decision must include whether or not it is likely that obstacles will obstruct the navigation path. Methods described herein can be used to quantify the likelihood that the path will be obstructed and, by doing so, can enable safe navigation of the intersection. The methods can determine if there is an obstacle predicted in the navigation path during a percentage of a sliding window during a decision-making timeframe. In some configurations, the sliding window can be a 3-second window, and the decision-making timeframe can be 20 seconds. Any time values can be used for the window and timeframe, based at least upon local conditions. The window can slide as time passes, and the AV can use information about obstacles during the sliding time window to determine whether to enter the intersection or not. One goal is to avoid starting a new sliding window every time the pre-selected window time expires. In some configurations, the decision-making timeframe corresponds to the time that the AV waits at the stop line before requesting remote assistance in the form of, for example, but not limited to, a check-in. The remote control process can assess the surroundings and possibly send a start request to trigger the AV to traverse the intersection autonomously. If the AV is informed that there are obstacles in the intersection, it is still possible that the data provided to the AV could include false positive obstacles or phantom obstacles. Because of the possibility of unreliable data, there can be built-in times during which the AV awaits sensor stabilization or other ways that can enable a reliable obstacle reading. When remote control process assistance is requested, the remote control process can assess the surroundings of the AV and send a start request, enabling the AV to traverse the intersection autonomously. The pre-selected amount of time can be chosen at 20 seconds.

Continuing to refer to FIG. 5E, the persistence of an object in an intersection can be used to fine-tune object avoidance. The foundational idea of obstacle persistence is if there is at least one obstacle in the intersection for a pre-selected window of time within a pre-selected timeframe, the AV will not enter the intersection. Computing a value for persistence can include computing values, referred to herein as weighting factors, that give a measure of importance to the appearance and disappearance of obstacles in the intersection. Because obstacle appearance and disappearance happens over a period of time, the AV can maintain at least two timers related to obstacles in an intersection. A first timer is referred to as a timeframe that is divided into windows having a second timer. The timeframe is used to measure a time period during which obstacles and the intersection are observed. The amount of time in a timeframe and the amount of time in a window can be constant, can vary over the course of the navigation, can be dynamically determined, or any other method that is appropriate for a particular navigation. When the amount of time in the timeframe has expired and the AV is still at the stop line waiting for the intersection to clear of obstacles, control can be transferred to a remote control processor that can possibly navigate the AV through the intersection. If the amount of time in the timeframe has not passed, an obstacle weighting factor process can proceed.

Continuing to refer to FIG. 5E, the AV can receive a vector of trajectory messages, where each element in the vector represents a static/dynamic obstacle trajectory. Static obstacle trajectory messages can provide instantaneous object information without associated object velocities. The trajectory messages can be used to determine among other things, (1) the speed of the fastest dynamic obstacle, (2) the distance between the AV and the dynamic obstacle that is closest to the AV, and (3) the distance between the AV and the static obstacle that is closest to the AV. This information can be converted into weighting factors that can fall between 0 and 1. FIG. 5I shows the graph of the weighting factor functions 9201 (FIG. 5I) versus speed 9203 (FIG. 5I) or distance 9205 (FIG. 5I).

Continuing to refer to FIG. 5E, one of the weighting factors, $w_{time}$, attaches a weight to how much progress has been made through a window. The value of $w_{time}$ can drop linearly or according to any other function, and can ultimately drop to zero at the end of a window. The value of $w_{time}$ can be reset when the amount of time a window occupies elapses, that is, when the subsequent period of time begins and a new window, and possibly a new timeframe, start. Through the window of time, $w_{time}=1.0-$(current cycle count/total number of cycles). The current obstacle count is a count of the obstacles in the sensor range of the AV. The total number of cycles is computed as the cycle rate times the number of seconds into the window. For example, at a cycle rate of 20 HZ, at 2 seconds into the 3-second window, the number of cycles is 40. In this process, types of obstacles, for example, but not limited to, dynamic and static obstacles, are given weights that are usually dependent upon the distance between the AV and the obstacle. The speed of the obstacle, if moving, can also be given a weighting factor. The final weighting factor computation is the maximum of the computed weighting factors. The obstacle weighting factors, both moving (dynamic) and static, in the intersection, $w_{obstacle}$, can be computed as follows:

$w_{speed}=1.0-e^{-Av}$ is the weighting factor based on the speed in meters/second, v, of the fastest dynamic obstacle, the value of A is a function of the allowed speed of the road upon which the obstacle is traveling. In some configurations, A can be empirically determined and can take a value such as, for example, but not limited to, 0.16.

$w_{dynamicDist}=-d_d/B+1.0$ is the weighting factor based on the distance in meters, $d_d$, between the fastest dynamic obstacle and the AV, the value of B is a function of the perception range of the AV. In some configurations, the sensor is a radar, and the maximum range is 40 meters.

$w_{staticDist}=-d_s/B+1.0$ is the weighting factor based on the distance in meters, $d_s$, between the closest static obstacle and the AV, the value of B is based on the perception range of the AV.

$w_{obstacleMax}(t) = \max(w_{speed}, w_{dynamicDist}, w_{staticDist})$ is the weighting factor of obstacles in the current window at the current time.

$w_{obstacle} = (w_{obstacleMax(t)})$

Using these weighting factors, persistence can be calculated as $(w_{time}+w_{obstacle})/2$.

In computing persistence as the average of the values of $w_{time}$ and $w_{obstacle}$, the effect is that AV must wait until a certain amount of time has passed to move forward through an intersection. Even if the value of $w_{obstacle}=0.0$, when using the average of $w_{time}$ and $w_{obstacle}$, the AV may not be forwarded through the intersection until $w_{time}$ reaches a non-zero value, for example, 0.4, which is a weighting factor corresponding to 1.8 seconds. A low value of persistence indicates that it is safe for the AV to enter an intersection, whereas a high value indicates that it's safer to remain at the stop line. In particular, in some configurations, a value greater than 0.2 can indicate that the AV should remain at the stop line. In some configurations, when A=0.16 and B=40 m, an obstacle that is 23 m from the AV and traveling at 3.2 m/s will trigger a decision to remain at the stop line.

Continuing to refer to FIG. 5E, method 8150 can provide one implementation of a persistence computation. In particular, if 8151 the time the AV has been waiting at the stop line has exceeded a pre-selected timeframe, method 8150 can include setting 8153 the maximum speed to 0.0 m/s, i.e. stopping at the stop line, and transferring 8155 control to a remote control processor. If 8151 the time the AV has been waiting at the stop line has not exceeded the pre-selected timeframe, method 8150 can include computing 8157 weighting factors used to compute obstacle persistence. The weighting factors can include, but are not limited to including, weighting factors based on the speed of the fastest dynamic obstacle, the distance between the AV and the closest dynamic obstacle, the distance between the AV and the closest static obstacle, and a maximum of the computed weighting factors at the current time.

Figure 5F:
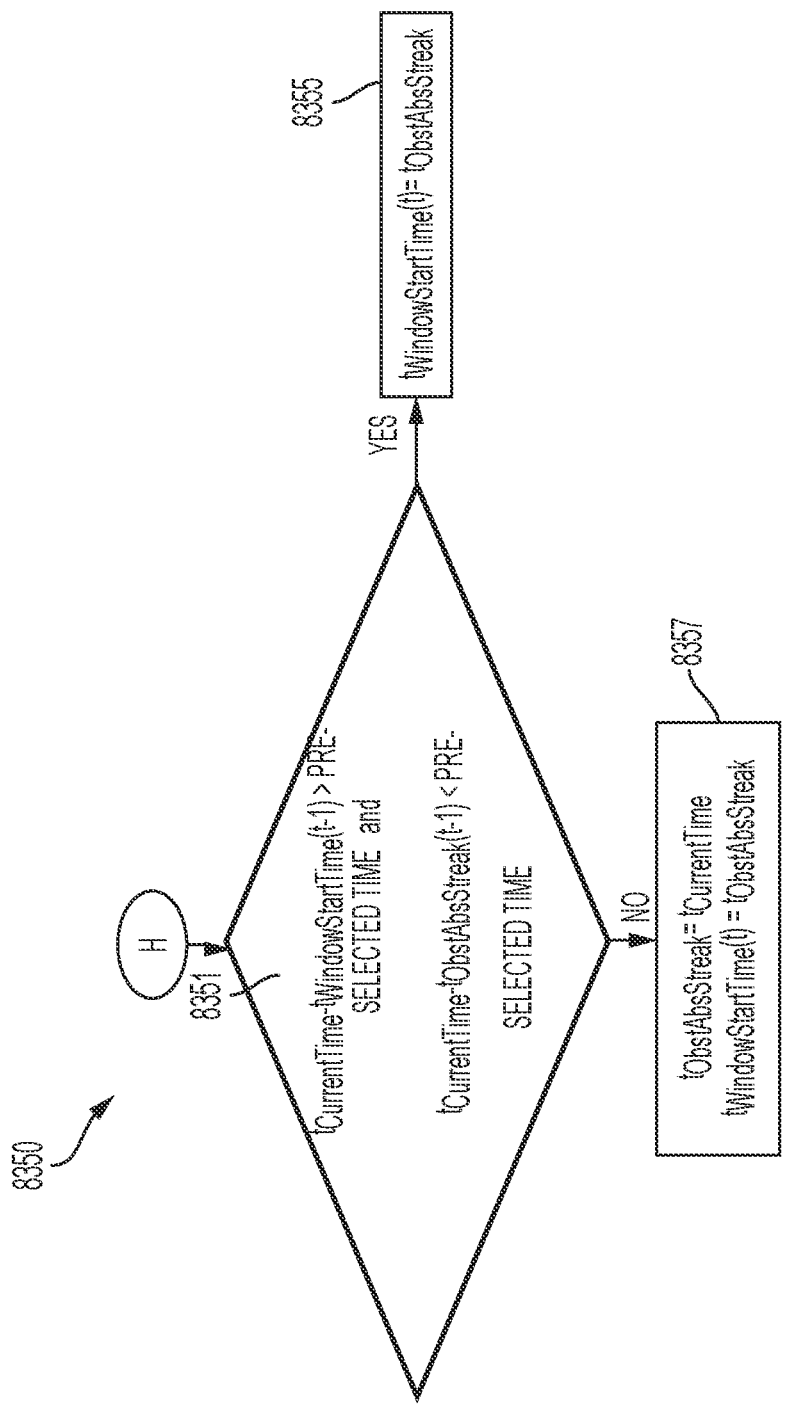

Referring now to FIG. 5F, after the weighting factors are computed, a streak of time when there are no obstacles in the intersection can be evaluated. If 8351 the difference between the current time and the start time of the previous time window is greater than a pre-selected amount of time, and if 8353 the difference between the current time and the time of the beginning time of an obstacle absent streak is less than the pre-selected amount of time, method 8350 can include setting 8355 the window start time at the current cycle to the time of the obstacle absent streak. Otherwise, method 8350 can include setting 8357 the beginning time of the obstacle absent streak to the current cycle time, and setting the window start time of the current cycle time to the time of the beginning of the obstacle absent streak.

Figure 5G:
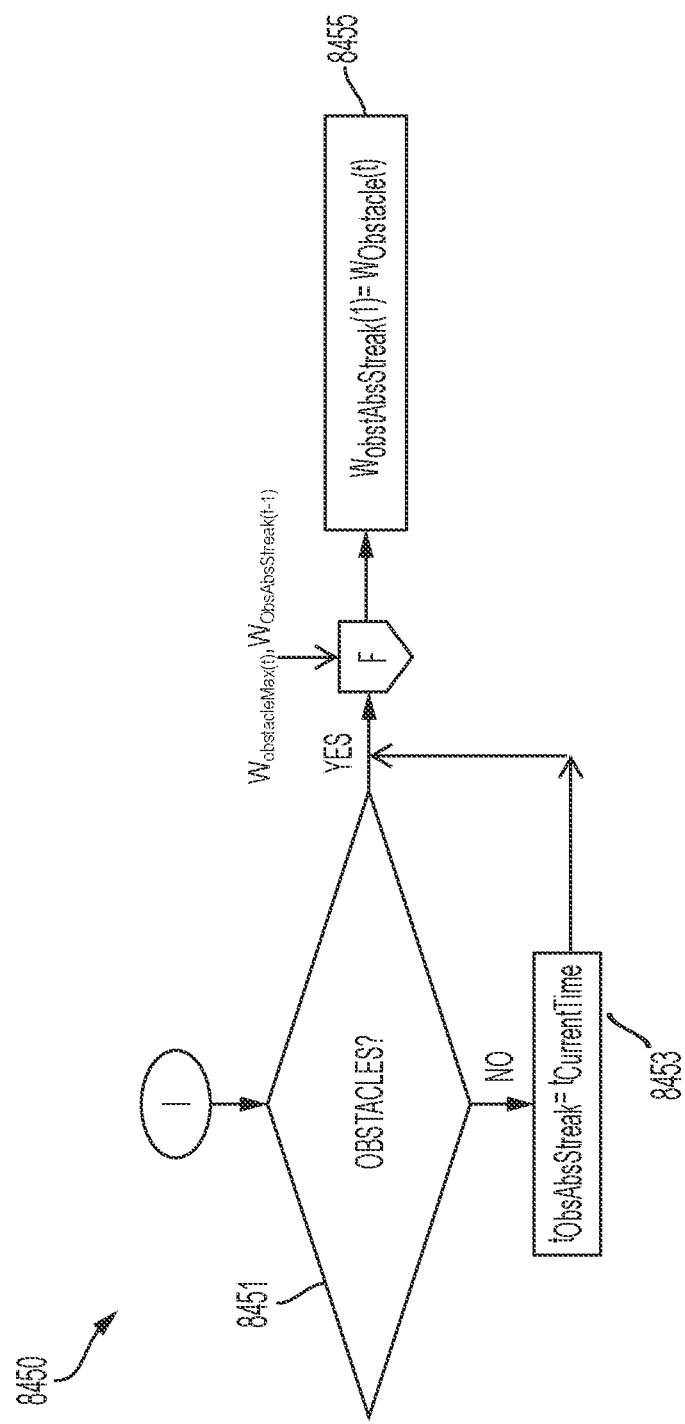

Referring now primarily to FIG. 5G, method 8450 can compute the weighting factor for an obstacle streak if there are obstacles in the intersection. If 8451 there are obstacles in the intersection, method 8450 can include determining an influence factor and setting 8455 the obstacle absent streak weighting factor at the current cycle time to the obstacle weighting factor at the current cycle time. If 8451 there are no obstacles present in the intersection, method 8250 can include setting 8452 the time of the obstacle absent streak to the current cycle time and additionally determining an influence factor and setting 8454 the obstacle absent streak weighting factor at the current time to the obstacle weighting factor at the current time. The 3-second time window inside the 20-second time frame is a sliding window. This window slides as time passes, and the AV makes consecutive no-go decisions when there are obstacles in the intersection. The goal is to avoid starting a new window every 3 seconds. This is because even though the previous window resulted in a high persistence value, it could be that it had obstacles only at the starting portion of the window. To decide where to slide the 3-second window, the latest obstacle absent streak is tracked. This streak points to a portion of time in the nearest past where there were no obstacles, and the accumulated $w_{obstacle}$ weighting factor that can be used as part of the next 3-second window. This process could lead to a more timely entry into the intersection.

Continuing to refer to FIG. 5G, to decide where to slide the window to the subsequent time period, a latest obstacle absent streak statistic can be tracked to determine a portion of the sliding window in the nearest past where there were no obstacles. In some configurations, for each 3-second time period, a record can be made of the last time there was a time period when there were no obstacles sensed. For example, if there were a time period towards the end of the 3-second window where there were no obstacles, even though the cumulative weighting factor of the 3-second window exceeded 0.8, there is no need to start each new 3-second window afresh. One way to accommodate this situation is to track a last absence streak. The last absence streak can include the time between when obstacles were observed. The streak could have ended or could be ongoing. With at least one boundary of the streak determined, $w_{obstacle}$ is accumulated from the start of the streak to the current time. When the next 3-second window starts, if there has been an absence streak, the accumulated $w_{obstacle}$ can be associated with the start time of that window. The latestObstacleAbsentStreak object can include the following information:

mStreakStartTimestamp=the time when the latest streak started. This is renewed each time there is a break in a streak and a new one starts;

mCycleCount=the number of cycles that have elapsed since mStreakStartTimestamp;

mTotalWeight=$w_{obstacle}$ of the current cycle; and mStreakEnd=true if the latest streak has ended, false otherwise.

If false, the latest streak is still the current streak and no obstacle has been seen yet since the latest streak commenced. When the current 3-second window slides because it expires and a no-go decision is made, the window slides to mStreakStartTimestamp as long as mStreakStartTimestamp is not 3 seconds or more old. If mStreakStartTimestamp≥3 seconds in the past then mStreakStartTimestamp is reset, and the sliding window is moved to start at the current timestamp. This process indicates whether the accumulated $w_{obstacle}$ can be used as part of the next sliding window and could lead to a more timely go decision.

Figure 5H:
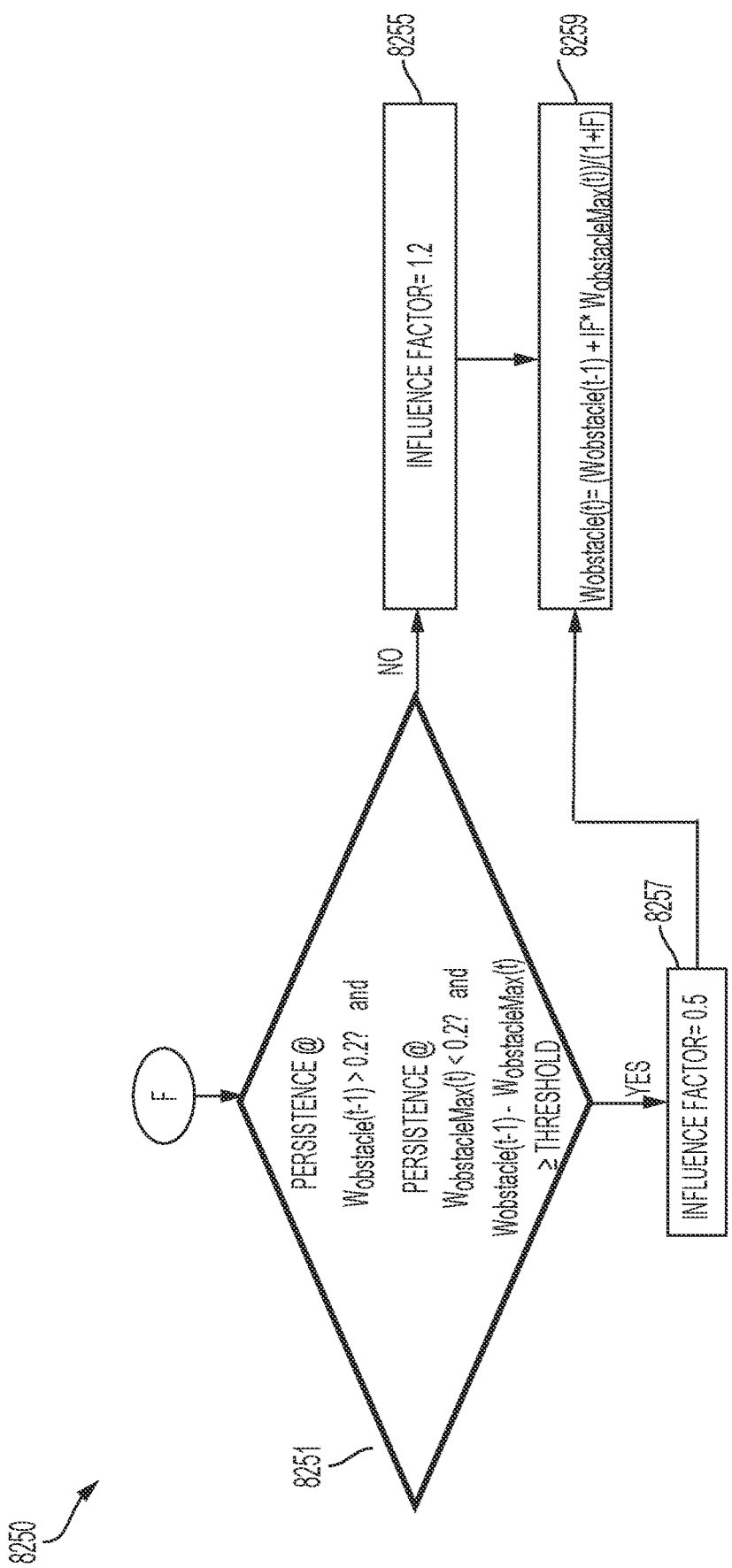
Figure 51:
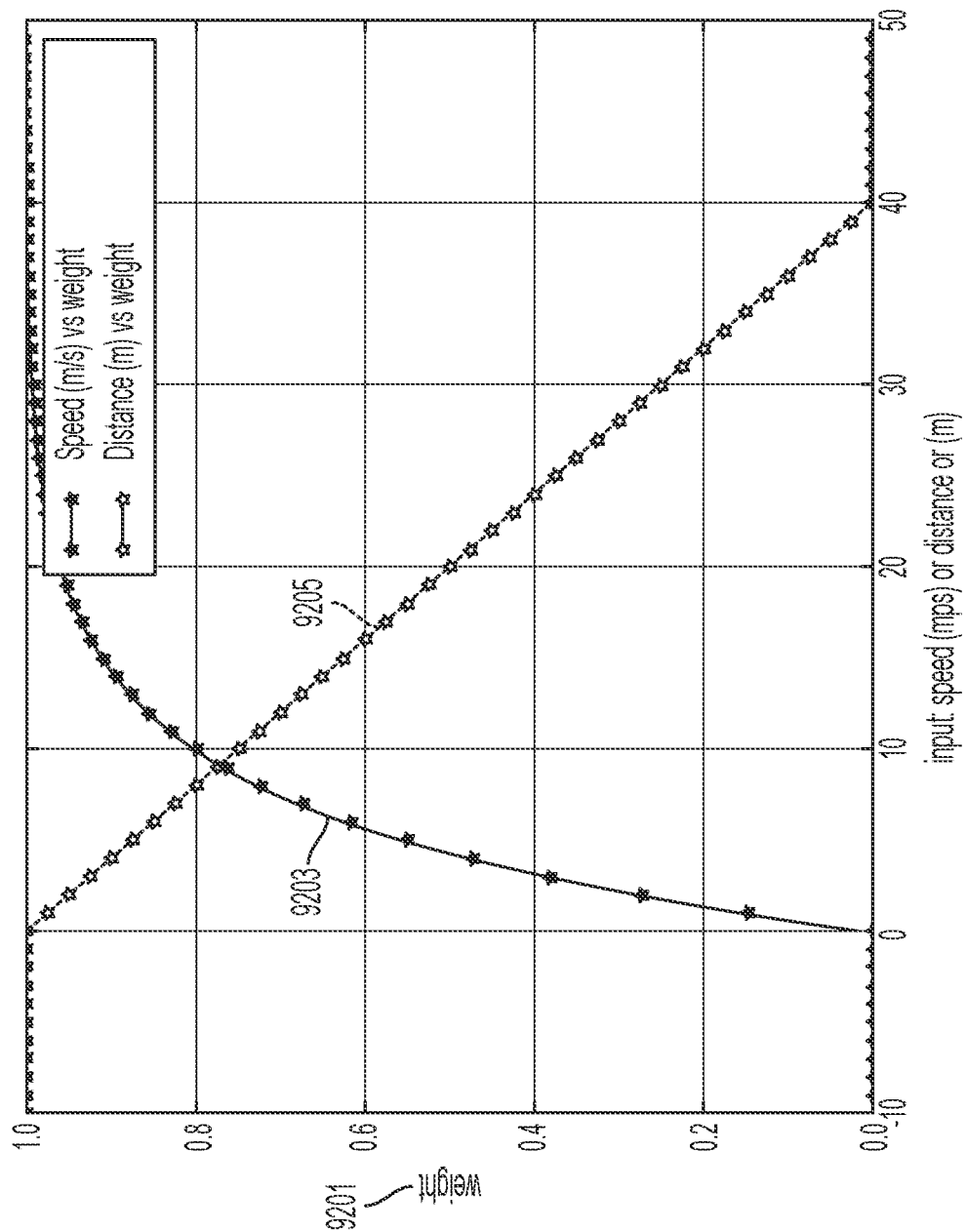

Referring now primarily to FIG. 5H, method 8250 can determine an influence factor and use it to modify the obstacle weighting factor. The influence factor can indicate how important an obstacle observation weighting factor is. In some configurations, the possible values for the influence factor can be empirically obtained. In some configurations, the influence factor can vary between 0.5 and 1.2. The value of $w_{time}$ can allow the persistence to decrease as the window of time wraps up. A decision to proceed through an intersection can be made when the persistence decreases. For example, if an obstacle suddenly appears with a high weighting factor, due to high speed or close proximity to the AV, it might be best for the AV to remain at the stop line. A high influence factor increases the importance of the $w_{obstacle}$ weighting factor. If an obstacle supplying a high weighting factor suddenly disappears, it could be due to a variety of reasons. For example, the sensor may have malfunctioned, or the obstacle could have moved to a place from which the available sensors cannot receive data. The disappearance results in the value of $w_{obstacleMax}(t)=0.0$, which could sway the value of $w_{obstacle}$ and enable the AV to inappropriately enter the intersection. Thus, under some circumstances, the influence factor of an obstacle that disappears suddenly can be decreased. An increase in the influence factor can provide a safety measure to ensure that an obstacle is not present before the AV enters the intersection. If the obstacle persistence in a previous window of time is less than or equal to 0.2, the influence factor can be assigned a first pre-selected value. When the obstacle persistence in the previous window is greater than 0.2 and the obstacle persistence in the current window of time is less than or equal to 0.2, the influence factor can be assigned a second pre-selected value. The first pre-selected value can be smaller than the second pre-selected value. The values and their sizes relative to each other can be constants that are empirically determined, or they can be dynamically determined and can change over the course of the navigation. When using the influence factor, the obstacle weighting factor in the current cycle can be modified by the obstacle weighting factor in the previous cycle so that the weighting factor reflects the importance of the obstacles in both the previous and the current cycles. In some configurations, the influence factor can take on the values of, for example, 1.2 as a default and second pre-selected value, and 0.5 as the first pre-selected value if one more obstacles disappear suddenly, for example, which could lead to the AV's entering the intersection if the incoming observation obstacle weighting factor is low.

Continuing to refer to FIG. 5H, an implementation of the persistence and influence factor strategy of the present teachings can include method 8250 for modifying the obstacle weighting factor at the current time. Method 8250 can be invoked after method 8150 (FIG. 5E) increments 8159 (FIG. 5E) the cycle count. If 8251 the persistence as a function of the obstacle weighting factor in the previous cycle is greater than a pre-selected value, for example, but not limited to, 0.2, and if 8251 the persistence as a function of the maximum of the weighting factors in the current cycle is less than or equal to the pre-selected value, and if the difference between the obstacle weighting factor in the previous cycle and the maximum weighting factor in the current cycle is greater than or equal to a pre-selected value such as, for example, 0.2, method 8250 can include setting 8257 the influence factor (IF) to a pre-selected first value, for example, but not limited to, 0.5, and setting 8259 the obstacle weight at the current cycle to $w_{obstacle}(t)=(w_{obstacle}(t-1)+IF*w_{obstacleMax}(t))/(1+IF)$. Otherwise, method 8250 can include setting 8255 the influence factor (IF) to a pre-selected second value, for example, but not limited to, 1.2, and setting 8259 the obstacle weighting factor at the current time to $w_{obstacle}(t)=(w_{obstacle}(t-1)+IF*w_{obstacleMax}(t))/(1+IF)$.

Referring again to FIG. 5E, method 8150 can complete the computation of persistence by setting 8161 the obstacle weighting factor for the previous cycle to the obstacle weighting factor for the current cycle, setting 8163 the time weighting factor at the current cycle to $w_{time}(t)=1.0-(\%$ progress in $3s$ window), and computing 8165 the persistence as the average between the obstacle weighting factor at the current cycle and the time weighting factor at the current cycle.

Referring now to FIGS. 5E, 5F, and 5H, for example, if in the first 3-second window of the 20-second decision timeframe, it is determined if there are obstacles for too great a period of the time, a no-go decision based on obstacles can be made. If there are obstacles for a pre-selected amount or more of the time in a 3-second window, a subsequent 3-second window in the 20-second decision timeframe can be assessed, weighted by the results of the previous window's obstacle evaluation. This step-wise decision making process can continue until the entire 20-second timeframe is assessed, if necessary. Even though the previous window might have resulted in a high persistence value, it is possible that obstacles were detected at the starting portion of the sliding window.

Referring again to FIG. 5C, if 9567 the persistence is less than or equal to a pre-selected value such as, but not limited to, 0.2, method 9550 can include setting 9571 the speed of the AV to a maximum speed for the conditions. Otherwise, method 9550 can include setting 9569 the speed of the AV to 0.0 m/s.

Referring now to FIGS. 6A and 6B, DOP 8471 (FIG. 8) provides dynamic obstacles that fall within the AV's lanes of interest (LOI) 9209. Static obstacles 9219 can be provided as well. Criteria for navigating the AV through intersection 9201 autonomously when obstacles are present can include whether the AV is occupying an automobile-type roadway or a pedestrian-type roadway. When the AV is traversing the roadway as an automobile (as in FIG. 6A), obstacles 9211/9213 behind AV 8009 in the same lane 9209 can be ignored. Whether or not an obstacle is considered to be behind the AV is based upon whether or not the obstacle is located in pre-selected travel areas. In some configurations, when AV 8009 is traversing a roadway as a pedestrian (as in FIG. 6B), pedestrians 9215 are considered to share the roadway with the AV and are therefore not considered when computing persistence. There is a waiting period, for example, but not limited to, 5 seconds, before entering the intersection to ensure that the obstacles received have resulted from stable sensor readings. Obstacles can be received during this 5 second wait time.

Figure 7:
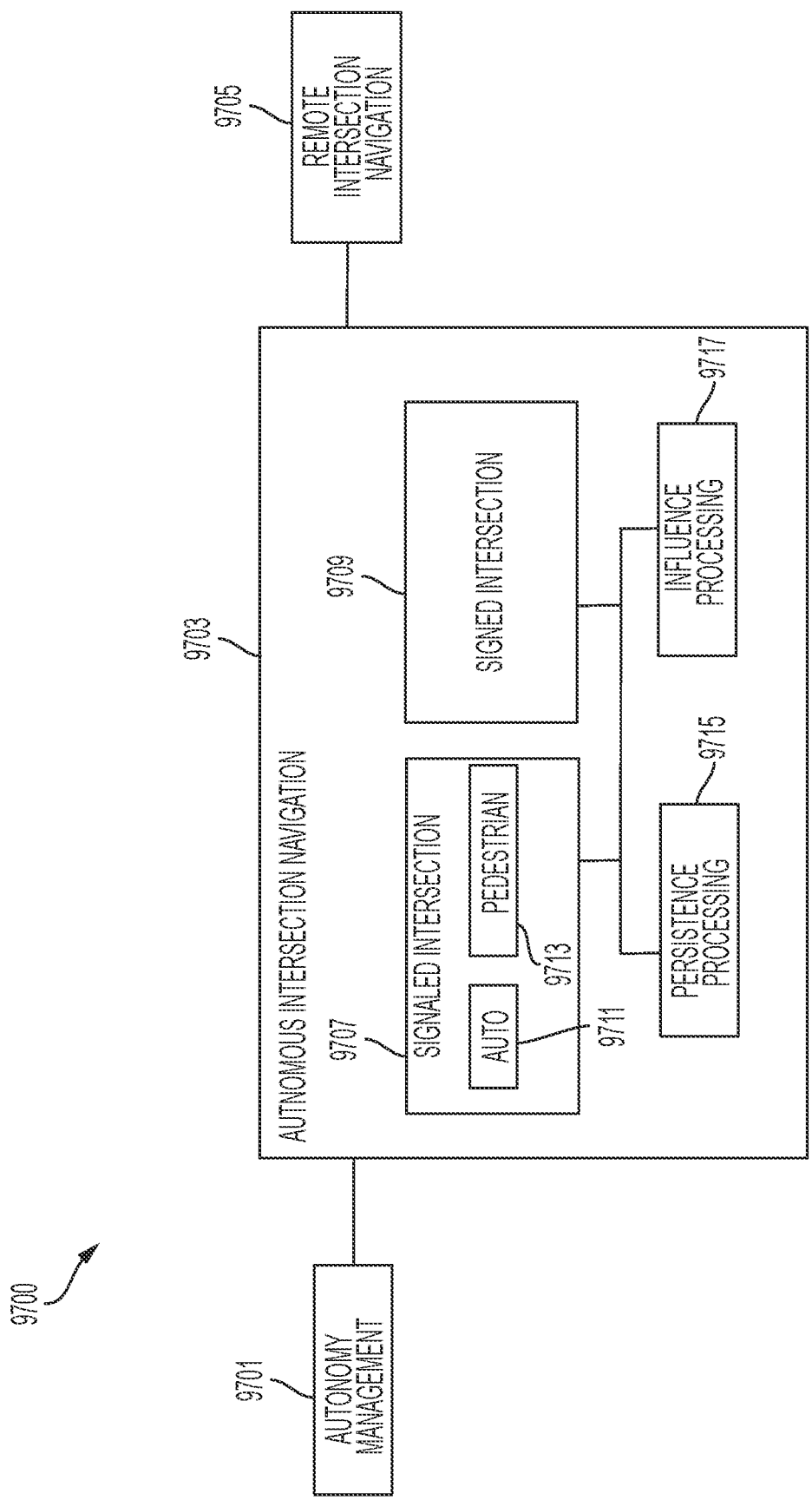
FIG. 7 is a schematic block diagram of the system of the present teachings.

Referring now to FIG. 7, system 9700 of the present teachings for autonomous vehicle navigation can include, but is not limited to including, autonomy management 9701, autonomous intersection navigation 9703, and, optionally, remote intersection navigation 9705. Autonomy management 9701 can process incoming data from, for example, but not limited to, sensors, historical geographic information, and route information, and create commands to move the AV safely on roads and sidewalks. Autonomy management 9701 can call on various subsystems for assistance, including autonomous intersection navigation 9703 that can address the situation when the AV encounters an intersection. When the AV can navigate the intersection autonomously, autonomous intersection navigation 9703 can, for example, but not limited to, determine the speed of the AV in an intersection situation, which obstacles to avoid and which to ignore, and whether or not to request help from a remote processor. Remote intersection navigation 9705 can navigate the AV safely when help is requested or when remote intersection navigation 9705 determines that the AV may have its operations compromised, for example, when sensors have become unable to properly distinguish the surroundings of the AV. Autonomous intersection navigation 9703 can manage situations in which the AV is navigating on road 9711, possibly in traffic, or on sidewalk 9713, possibly encountering pedestrians, bikers, etc. Further, autonomous intersection navigation 9703 can manage situations in which the AV is navigating through signed intersection 9709 or signaled 9707 intersection. Persistence processing 9715 can manage situations in which there are obstacles in the intersection by evaluating obstacle persistence over a time period, and influence processing 9717 can manage situations in which there are obstacles in the intersection from one time period to the next. In some configurations, obstacles presence can be evaluated in both signed and signaled intersections. In some configurations, the AV can follow a first set of strategies when vehicles occupy an intersection (signed or signaled), and a second set of strategies when pedestrians occupy an intersection (either signed or signaled).

Continuing to refer to FIG. 7, autonomous navigation can be augmented by remote assistance. Exemplary scenarios follow. Other scenarios are possible. In some configurations, these exemplary scenarios can be handled entirely autonomously. In some configurations, complex intersection structures such as, for example, but not limited to, left turn intersections, can be pre-established as intersections that are managed by remote intersection navigation 9705. When a complex intersection is encountered, the AV can stop at the stop line and request remote control assistance at the stop line. Remote intersection navigation 9705 can take control and drive the AV through the intersection in a safe manner, and then return to autonomous intersection navigation 9703 after the intersection is traversed. When the AV is stopped at an intersection waiting for obstacles to be cleared from the intersection, if there is a large number of targets, for example, the AV can request a check in from remote intersection navigation 9705. When remote intersection navigation 9705 deems that the intersection is safe for traversal, remote intersection navigation 9705 can return control to autonomous intersection navigation 9703. A stop request from remote intersection navigation 9705 can be issued if, for any reason, remote intersection navigation 9705 detects that the AV is making a wrong decision, possibly based on AV perception issues. Remote intersection navigation 9705 can bring the AV to a halt at the stop line. The AV can await return of autonomous control until remote intersection navigation 9705 determines that, for example, but not limited to, the perception predictions (e.g. for traffic lights, signs) and/or the decision taken by the AV are correct. If the AV has crossed the perception minimum range line, for example, if the AV is in the middle of an intersection, and remote intersection navigation 9705 sends a stop request, remote intersection navigation 9705 can control the AV through the rest of the intersection, and can return the AV to autonomous control when intersection traversal is complete. At intersections where it is difficult for the AV to make decisions, the AV can wait at the stop line and call for remote intersection navigation 9705 assistance to determine if the intersection is safe to traverse. Examples of such intersections are railway crossings, and sidewalk to road transitions due to possible occlusions at the transition areas from parked cars. These intersections can be pre-determined or dynamically determined. After remote intersection navigation 9705 determines that the intersection is safe for traversal, autonomous control can be restored.

Figure 8:
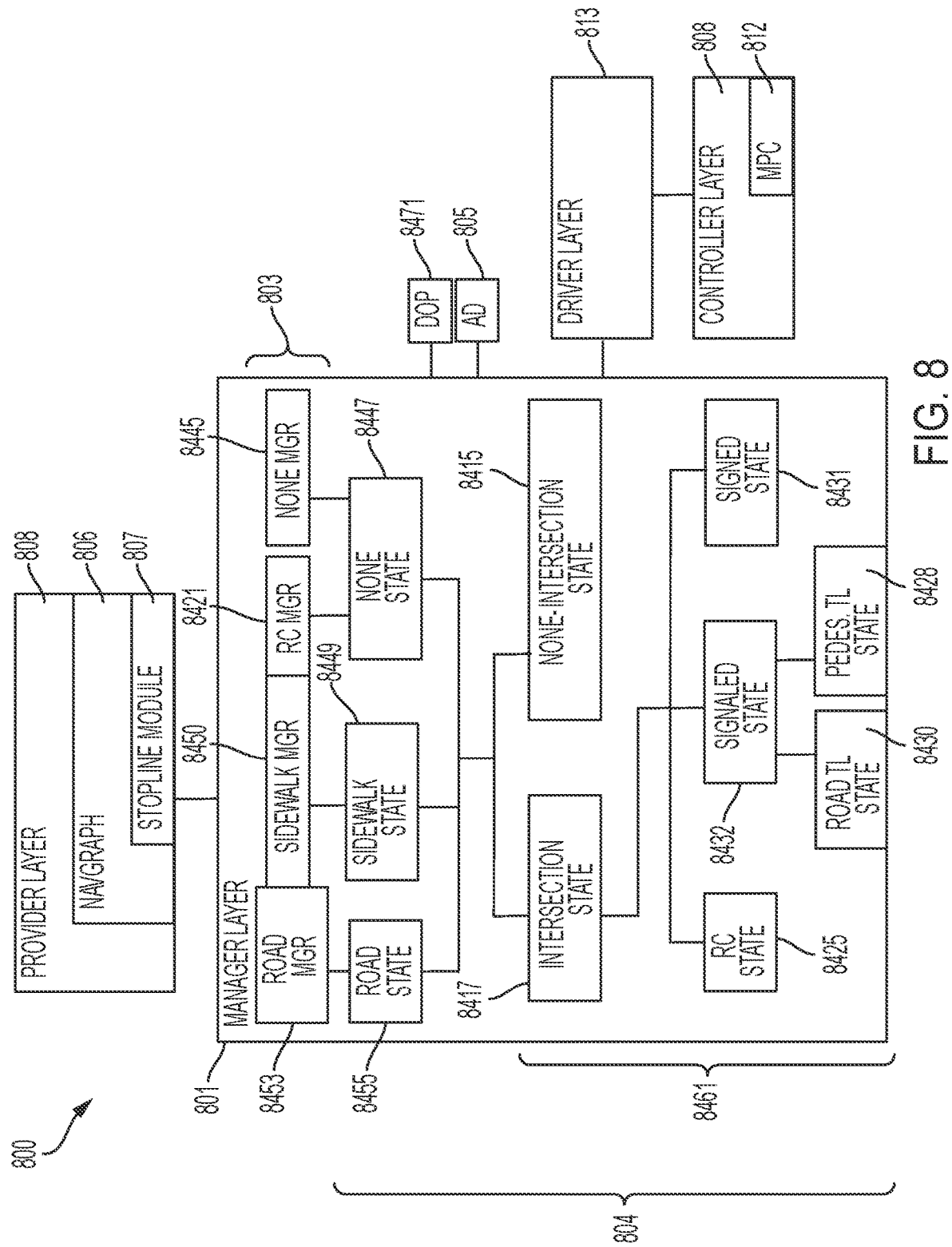
FIG. 8 is a schematic block diagram of an implementation of the system of the present teachings.

Referring now to FIG. 8, an exemplary implementation of the autonomous navigation system of the present teachings is shown. System 800 provides an AV architecture that can enable the AV to safely traverse intersections. In some configurations, manager layer 801 of system 800 can provide the interface between managers 803 and the rest of the communications network coupling the components of system 800 with each other. Manager layer 801 can receive maps of the area that is being traversed by the AV, traffic light location and state, and lane information from provider layer 808, an initial maximum speed of the AV, and a manager that is to take charge (selected from, for example, but not limited to road manager 8453, sidewalk manager 8450, remote control manager 8421, and none manager 8445) from AD 805, and a filtered dynamic obstacle list from dynamic obstacle provider 8471.

Continuing to refer to FIG. 8, with respect to signals, managers 803 are expecting to receive traffic light states of red/green/unknown/yellow, among other data, for example, lighted arrows, timers, and other possible lighted options. Managers 803 (FIG. 8) can publish reduced maximum speeds based on, for example, if the distance from the AV to stop line 8011 is greater than, less than, or equal to the braking distance. Managers 803 can operate in various states discussed herein. Manager FSM 804 states are dictated by AD 805 and intersection states 8461 are dictated by stop line module (SLM) 807 discussed herein.

Continuing to refer to FIG. 8, in some configurations, managers 803 can include, for example, but are not limited to including, road manager 8453, sidewalk manager 8450, remote control manager 8421, and none manager 8445. In some configurations, AD 805 supplies manager type 803. Each manager 803 corresponds to manager FSM state 804. For example, road manager 8453 corresponds to road state 8455, sidewalk manager 8450 corresponds to sidewalk state 8449, and remote control manager 8421 and none managers 8445 correspond to none state 8447. Autonomy director (AD) 805 chooses an active manager based at least on the type of lane the AV is traveling in, and sets the maximum speed for the active manager chosen. The initial maximum speed is based at least on the lane in which the AV is traveling, intersections in the vicinity of the AV, and possibly other factors. Lane classes can include, but are not limited to including, unknown, pedestrian, bicycle, road, parking lot, and parking space. In some configurations, sidewalk lanes have a pedestrian lane class, road lanes fall under road lane class, roads inside parking lots have parking lot class, and parking spaces in a parking lot have a parking space lane class, for example. Lane classes can enable determining an upper limit of the speed of the AV in each of the different lane classes for safety. For example, in some configurations, the AV should not travel faster than a human would travel on a sidewalks so the maximum speed of the AV on sidewalks can be slower than the maximum speed on roadways. The intersection can include multi-way road crossings. The state machines can modify the initial maximum speed based on current context including, for example, but not limited to, traffic light presence and state, and traffic sign presence and type. Whichever manager is in control can provide a maximum speed to other parts of the system that control the speed of the AV. A main function of managers 803 when approaching and traversing an intersection is to provide to MPC 812 the maximum speed that the AV is to travel at each point in the process. To stop the AV, managers 803 can arrange to send a speed of 0.0 m/s to MPC 812. The result is that the AV does not proceed until either managers 803 determine that the AV can be autonomously navigated, or until the control of the AV is taken over remotely. To proceed, managers 803 can arrange to send a non-zero speed to MPC 812. The result is that the AV proceeds, for example, through an intersection.

Continuing to refer to FIG. 8, sidewalk manager 8450 can include processing for traveling on a sidewalk with pedestrians, and road manager 8453 can include processing for traveling on a road with vehicles. When the AV is traveling on a road, AD 805 sets an initial maximum road speed, and when the AV is traveling on a pedestrian way, AD 805 sets an initial maximum pedestrian way speed. In some configurations, the initial maximum road speed can include, but is not limited to including, 3.1 m/s. The initial maximum pedestrian way speed can include, but is not limited to including, 1.5 m/s. Although most features of intersection processing are shared between road and sidewalk management, in some configurations, if there is a pedestrian on a sidewalk ahead of the AV, the AV traverses around the pedestrian if necessary, and continues to navigate the intersection. However, if there is a vehicle on the road, the AV can stop at the stop line until the intersection is clear. In some configurations, when the AV is traveling on a road, obstacles that are in the perception range of the AV but are behind the AV are not considered when the AV is deciding whether or not to traverse the intersection. Obstacles are considered to be behind the AV when they occupy the lane of interest over which the AV has already traveled.

Continuing to refer to FIG. 8, stop line module (SLM) 807 provides the location of stop line 8011 (FIG. 1A) to manager layer 801. SLM 807 can determine in real-time the location of stop line 8011 (FIG. 1A). SLM 807 can determine perception range 8005 (FIG. 1A) around AV 8009 (FIG. 1B) that defines the area from where traffic light 8007 (FIG. 1A) can possibly be seen by AV 8009 (FIG. 1A). Intersection entrance point 8012 (FIG. 1A) can be provided by navgraph 806. SLM 807 can compute an optimum stop line 8011 (FIG. 1A) based on the location of intersection entrance 8012 (FIG. 1A). SLM 807 can calculate the radius of perception range 8005 (FIG. 1A) as follows:

$$\text{Radius} = (\text{height of traffic light 8007 (FIG. 1A)} - \text{height of associated camera on the AV}) / (\tan(\text{field of view of associated camera}/2)$$

where both heights are measured in meters, and the field of view of the camera is measured in radians. Manager layer 801 needs a precise and smooth/predictable value for the distance to stop line 8011 (FIG. 1A) to command a slow-down when needed.

Continuing to refer to FIG. 8, SLM 807 is provided the pre-created map, left boundary 8018 (FIG. 3) and right boundary 8020 (FIG. 3). SLM 807 can compute dF 8004 (FIG. 3) (shortest distance between AV 8009 (FIG. 3) and a front border), dL 8002 (FIG. 3) (the distance between AV 8009 (FIG. 3) and left lane border 8018 (FIG. 3), dR 8024 (FIG. 3) (the distance between AV 8009 (FIG. 3) and right lane border 8020 (FIG. 3), and dB 8026 (FIG. 3) (the distance between AV 8009 (FIG. 3) and bottom border 8006 (FIG. 3). SLM 807 can begin sending information about stop line 8011 (FIG. 3) to manager layer 801 when AV 8009 (FIG. 3) reaches a pre-selected distance from the intersection. The pre-selected distance is based at least upon the maximum range of view of the sensors associated with AV 8009 (FIG. 3) and the type of traffic control available at the intersection. For example, the types of traffic control can include, but are not limited to including, at least one traffic light, at least one traffic sign, for example, a stop sign or a yield sign, and a virtual right of way indication. The current type of traffic control can be accessed by SLM 807 from the pre-created information associated with the current location of AV 8009 (FIG. 3). In some configurations, the pre-selected distance can include around 50 m when the type of traffic control is a traffic light. In some configurations, the pre-selected distance can include around 15 m when the type of traffic control is a sign or a virtual right of way. Other information provided to manager layer 801 when SLM 807 provides information about stop line 8011 (FIG. 3) can include, but is not limited to including, the classification of the traffic signal, if the type of traffic control is a signal, the classification of the traffic sign if the type of traffic control is a sign, the identification of way 8024, whether the AV is not being controlled remotely, and whether or not forced checkin is desired. Forced checkin is desired if it is pre-determined that a remote control processor such as, for example, but not limited to, an operator, should verify whether or not the AV should enter an intersection. When SLM 807 begins sending location updates for stop line 8011 (FIG. 3) according to criteria set out herein, SLM 807 continues sending stop line location updates, route updates, and location of AV 8009 (FIG. 3) at pre-selected intervals, for example, but not limited to, 10 Hz. If AV 8009 (FIG. 3) is being controlled remotely, SLM 807 does not send updates.

Continuing to refer to FIG. 8, sample message from SLM 807 to manager layer 801 can include a signal classification field that indicates if the intersection state is signed (quantifiers 3-6) or signaled (quantifiers 1-2). The stop line message can also include a time stamp, a stop point, a way identification, and a yaw at perception range to enable moving the AV to face the road/pedestrian traffic signal. The stop line message can also include directions to the intersection state 8417 to request for remote control assistance (isRemoteControl=true) at the stop line where the remote control processor traverses the intersection and return control to the AV after the intersection traversal is complete. The stop line message can also include directions to the AV to check in with the remote control processor at the stop line (forcedCheckin=true), where the remote control processor can send a start request if the intersection is clear and the AV has right of way, for example at railway crossings and merging from a sidewalk to a bike lane. SLM 807 can deduce information that it provides manager layer 801 from the map associated with the travel geography. An exemplary stop line message follows:

secs: 1587432405 (time stamp seconds)
nsecs: 787419316 (time stamp nanoseconds)
signalClass: 1
wayID: "110"
isRemoteControl: False
virtualStopPointXY:
   x: −4.59256887436
   y: −6.44708490372
yawAtPerceptionRangeMin_rad: 2.24184179306
forcedCheckIn: True
signalYaw_rad: 1.24184179306
perceptionRangeMinSeq: 108 where the time stamp can be used to compare with the time that the current stop line arrived, in case a new stop line could be available, the way ID indicates the way in which the stop line is located, and the sequence number indicates the route point that is closest to the stop line, the virtual stop point indicates the x,y position of a point that falls on the stop line 8011. This information is used by the managers to determine if the stop line has been reached or crossed. If the orientation of the traffic signal (signalYaw) is within a pre-selected threshold, such as, for example, but not limited to ±20° of the orientation of the AV, the AV is assumed to be able to observe the face of the traffic signal. If the orientation of the traffic signal and the current orientation of the AV differ by more than the pre-selected threshold, the AV can be re-oriented by the difference. If the AV is navigating on a sidewalk, the AV can wait for a pre-selected amount of time depending upon, for example, a known sensor stabilization delay, for example, 1 second to observe the state of the traffic light.

Continuing to refer to FIG. 8, one scenario in which the AV can be re-oriented to face a traffic signal is if the navigation path includes a curb cut between a sidewalk and a crosswalk. In this scenario, the curb cut may not always face a pedestrian traffic light. The AV can be re-oriented at the stop line so that it faces the pedestrian traffic signal so that the AV can observe a pedestrian walk signal, for example. The re-orientation angle can bring the AV to an optimal orientation so that the AV sensors can obtain a pre-selected field of view, for example, but not limited to 40°. After the re-orientation, the AV can wait for a pre-selected amount of time depending upon, for example, the known sensor stabilization delay, for example, but not limited to, 1 second to observe the state of the signal.

Figure 9:
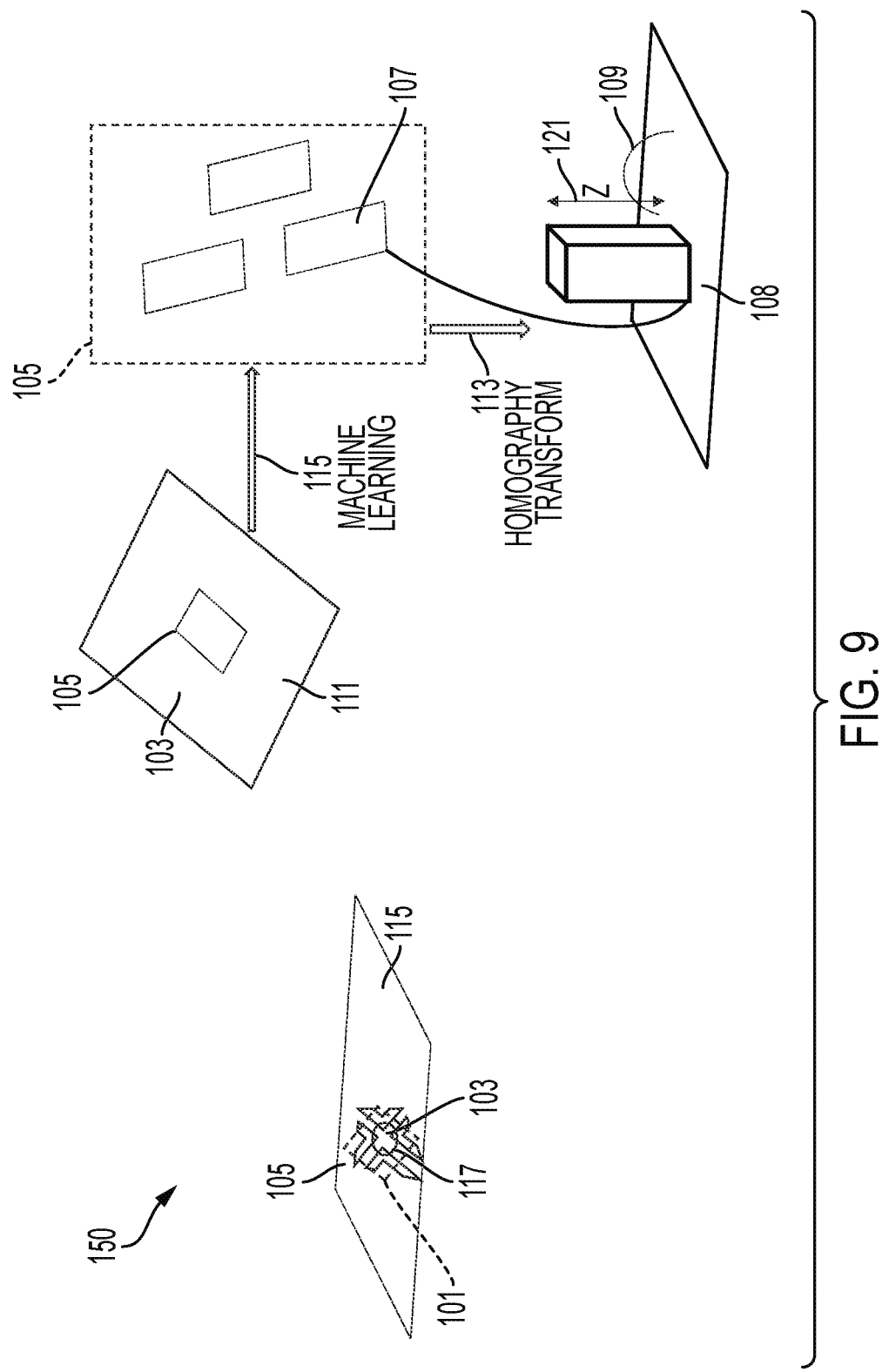
FIG. 9 is a pictorial representation of the method of the present teachings.

Referring now to FIG. 9, and with respect to map data, one implementation of determining the locations of traffic management features can include using information from different types of images, including oblique images. Use of various types images can increase the accuracy of locating traffic management features. Method 150 of the present teachings for identifying three dimensional positions of at least one traffic management feature 107 from at least one oblique image 111 can include, but is not limited to including, determining a latitude/longitude of the corners 117 of intersection 101 from at least one aerial image 115. Method 150 can include determining intersection region of interest 103 (with corner 105) from at least one oblique image 111 based on the latitude/longitude, and determining an estimated height of traffic management feature 107. The estimated height can be based on the average height for the type of feature, on empirical data associated with the region of interest, on data from the general area encompassing the region of interest, or any other suitable estimation method. Method 150 can include generating, based on machine learning 116, traffic management feature bounding box pixels 107 for traffic management features 108 within intersection region of interest 103. Method 150 can include calculating coordinates of traffic management feature 108, including altitude 121, based on homography transform 113 based on the estimated height and traffic management feature bounding box pixels 107. A segmentation model can optionally be used, for example, to determine the latitude and longitude of corners 117 of intersection 103. Identified features 109 that are shorter than the estimated height can optionally be discarded. Traffic management features 108 can include, but is not limited to including, traffic and pedestrian signs and signals.

Referring now to FIG. 10, each oblique image 111 (FIG. 9) associated with an intersection can be annotated according to an annotation process specific to the type of traffic management features 108. In some configurations, oblique images 111 (FIG. 9) can be collected from an oblique camera system looking at an angle down at the Earth. In some configurations, the angle can include a 45° angle. Each oblique image 111 (FIG. 9) can include objects of importance that can be annotated with bounding box 107 and, optionally, a text label. The bounding box can include top left co-ordinate (x1, y1) 1101 and bottom right co-ordinate (x2, y2) 1103. In some configurations, the images can include .png images, and the annotation outputs can be stored in a ".json"/".csv" format. For example, each image can be stored having a key ("Labels") in a json file followed by the value ("Traffic Light") as the object category and the bounding box information ("type", "index", and "points") for the respective box to describe traffic management feature 108:

[{"tags": {"Labels": "Traffic_Light"}, "type": "rect", "index": 1, "points": [x1, y1], [x2, y2]]},
{"tags": {"Labels": "Traffic_Light"}, "type": "rect", "index": 2, "points": [[x1, y1], [x2, y2]]}]

Unknown or unclear images that cannot be accurately annotated can be discarded.

Continuing to refer to FIG. 10, traffic management features 108 can include any signaling device positioned at road intersections that can control traffic flow of vehicles and pedestrians. Traffic signs and signals can control the flow of traffic, and pedestrian signs and signals can control the flow of pedestrians. Traffic signals can include, but are not limited to including, traffic lights hung on wires and traffic lights hung on poles. In some configurations, features that appear to be traffic lights hung on wires can be annotated as such even if the face of the traffic light is not seen, unless they are obscured by objects other than traffic lights. In some configurations, features that appear to be traffic lights hung on poles—both vertical poles and horizontal poles—can be annotated as such if the face is seen, and if they are not obscured by objects other than traffic lights. If the face of the feature is not seen, the traffic light pole can be obscuring part of the traffic light. In some configurations, features that appear to be traffic lights that are more than 50% obscured by objects other than other features that appear to be traffic lights are not annotated as traffic lights. In some configurations, if there are multiple features that appear to be traffic lights with some overlap with each other, the image can be annotated with multiple bounding boxes. In some configurations, if features that appear to be traffic lights occur on the edges of an image, the features can be labelled as such, if 80% or more of the object is inside the image.

Referring now to FIGS. 11-18, oblique images can be automatically annotated according to the types of traffic management features located in the oblique images, whether the traffic be vehicular or pedestrien. Processes for optimally annotating the oblique images can include the factors laid out herein. Specific types of traffic management features are discussed herein, but these automated annotation techniques can apply to any size, shape, and type of traffic management features.

Referring now to FIGS. 11 and 12, raw oblique images 111 can include intersection 103 and traffic management features 108. Intersection 103 can include intersection paths 125 (FIG. 12) and 127 (FIG. 12) that can include annotated traffic management features 107 (FIG. 12). In these examples, traffic management features 107 (FIG. 12) include traffic lights.

Referring now to FIGS. 13 and 14, oblique images 131/133 can include pedestrian signs/signals. Pedestrian signs/signals can include any signaling device positioned at road intersections or crosswalks 135/137 to allow pedestrians, bicyclists, and/or autonomous vehicles to cross a road. In some configurations, pedestrian signs/signals 108 (FIG. 14) that are more than 50% obscured by objects other than pedestrian/traffic signs/signals may not be annotated as pedestrian signs/signals. In some configurations, if there are multiple pedestrian signs/signals 108 (FIG. 14) with some overlap with each other, oblique image 131/133 can be annotated with multiple bounding boxes 107 (FIG. 14). In some configurations, if 80% or more of pedestrian sign/signal 108 (FIG. 14) is inside of oblique image 131/133, pedestrian sign/signal 108 (FIG. 14) can be annotated as such.

Referring now to FIGS. 15 and 16, oblique images 141/143 can include traffic management features 108 (FIG. 16) that can include traffic signs. Traffic management features 108 (FIG. 16) can include any shaped sign that can manage traffic at, for example, but not limited to, intersections 145/147. In some configurations, traffic management features 108 (FIG. 16) can include octogonally-shaped signs, optionally including the word "STOP". Traffic management features 108 (FIG. 16) that are more than 20% obscured may not be annotated as traffic signs. In some configurations, if 80% or more of traffic management feature 108 (FIG. 16) is inside of oblique image 141/143, traffic sign can be annotated as such. In some configurations, traffic sign 149 (FIG. 16) may not be annotated as such because it is not facing forward in oblique image 141.

Referring now to FIGS. 17 and 18, oblique images 201/203 include traffic management features 108 (FIG. 18). Traffic management features 108 (FIG. 16) can include any shaped sign that can manage traffic flow at, for example, but not limited to, yield areas 207/205. In some configurations, traffic management features 108 (FIG. 18) can include inverted triangle-shaped signs, optionally including the word "YIELD". Traffic management features 108 (FIG. 18) that are more than 10% obscured may not be annotated as traffic signs. In some configurations, if 90% or more of traffic management feature 108 (FIG. 18) is inside of oblique image 201/203, traffic management features 108 (FIG. 18) can be annotated as such.

Figure 19:
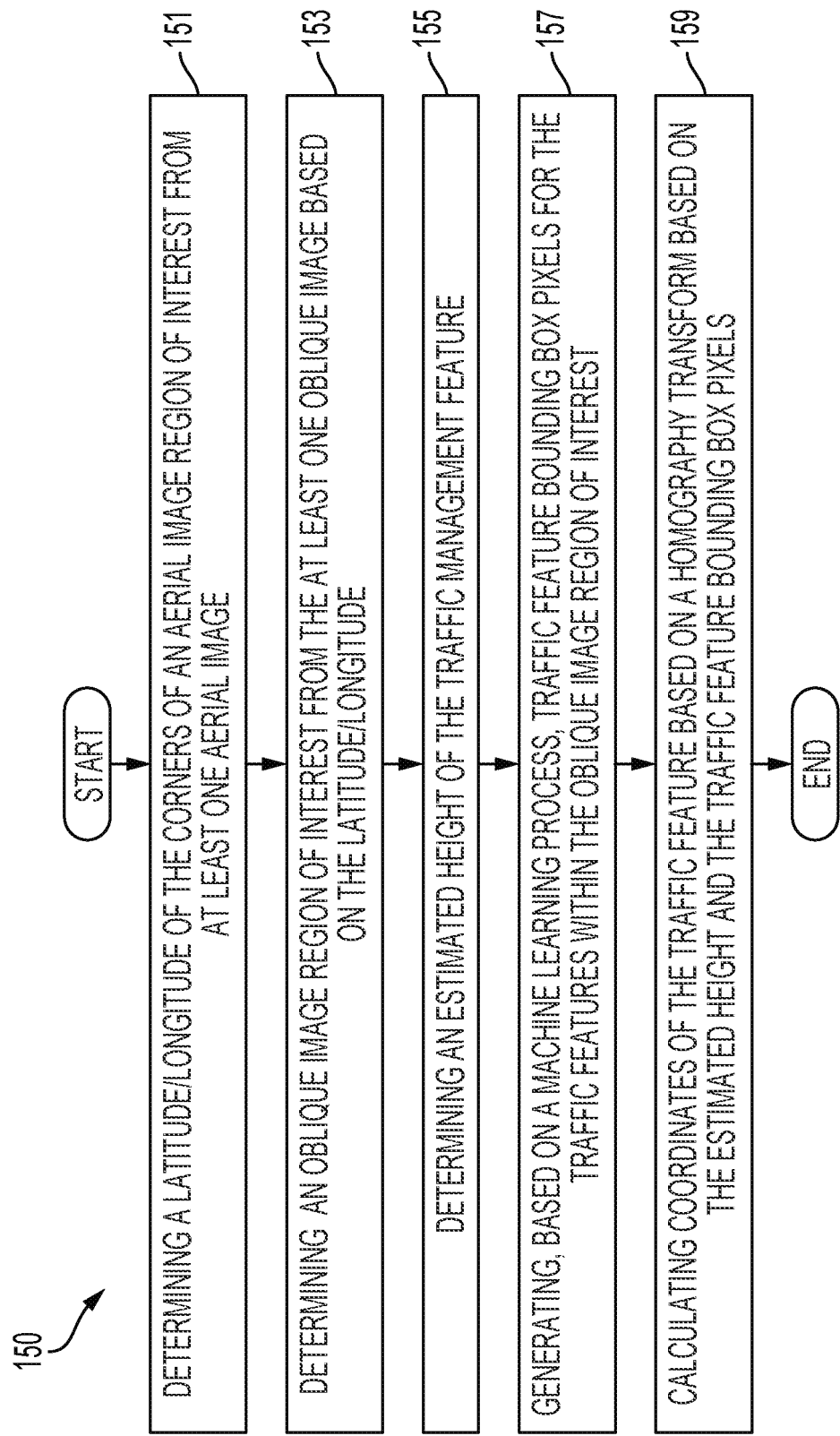
FIG. 19 is a flowchart of the method of the present teachings.

Referring now to FIG. 19, method 150 of the present teachings for identifying traffic management features can include, but is not limited to including, determining 151 a latitude/longitude of the corners of an aerial image region of interest from at least one aerial image, determining 153 an oblique image region of interest from the at least one oblique image based on the latitude/longitude, determining 155 an estimated height of the traffic management feature, generating 157, based on a machine learning process, traffic management feature bounding box pixels for the traffic management features within the oblique image region of interest, and calculating 159 coordinates of the traffic management feature based on a homography transform based on the estimated height and the traffic management feature bounding box pixels. Homography can be used to insert models of 3D objects into an image or video, so that they are rendered with the correct perspective and appear to have been part of the original scene. A homography matrix is a matrix that maps a given set of points in one image to the corresponding set of points in another image. The homography matrix is a 3×3 matrix that maps each point of a first image to the corresponding point of a second image. Homography can accomplish transforming images that were taken at different perspectives. For example, a homography matrix can be computed between two images of the same place taken from different angles. Pixels from one image can be transformed to have the same viewing perspective as pixels from another image by applying a homography transform matrix. Typically, homographies are estimated between images by finding feature correspondences in those images.

Figure 20:
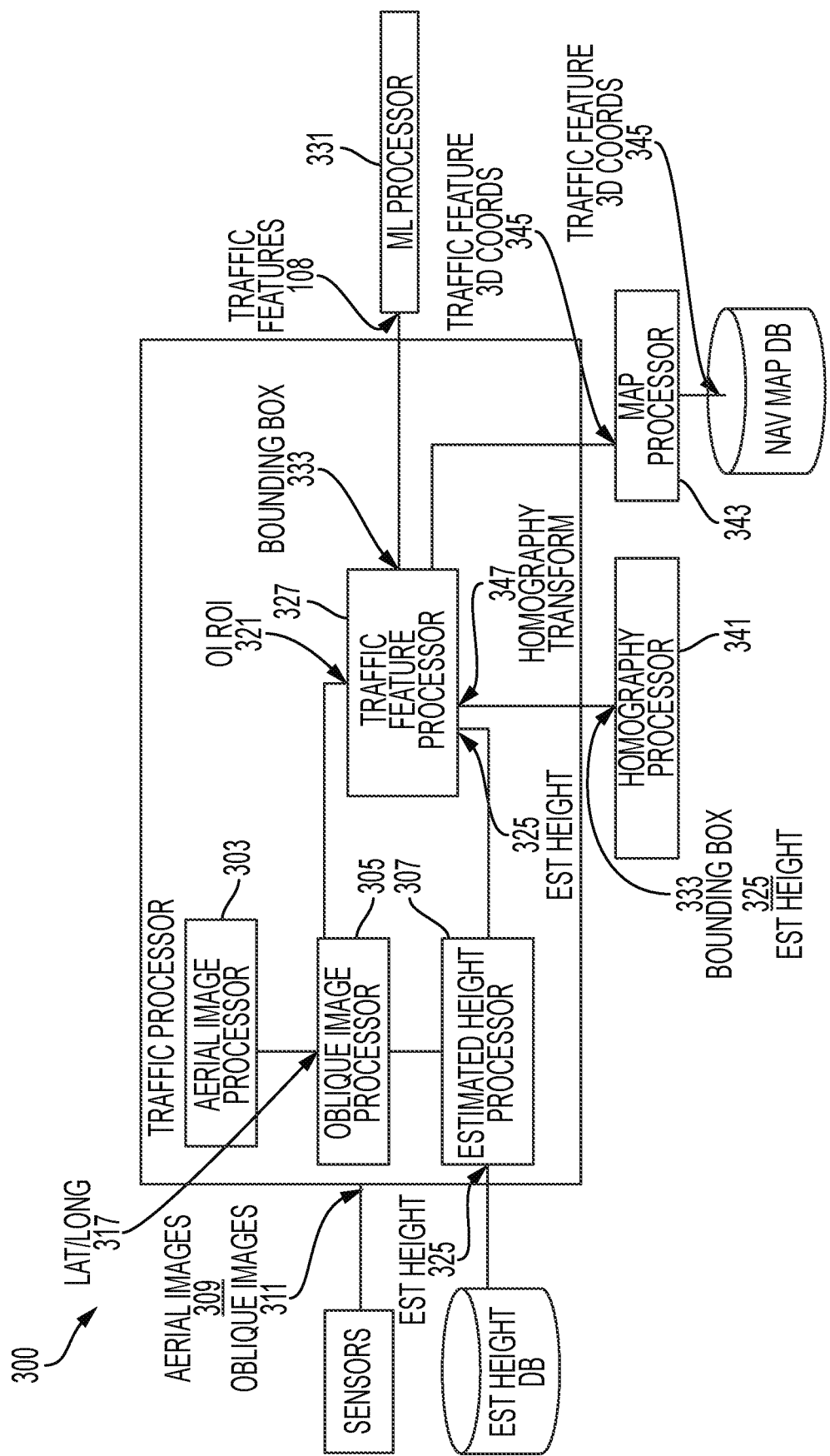
FIG. 20 is a schematic block diagram of the system of the present teachings.

Referring now to FIG. 20, system 300 of the present teachings for identifying traffic management features can include, but is not limited to including, aerial image processor 303 determining latitude/longitude 317 of the corners of an aerial image region of interest from at least one aerial image 309, and oblique image processor 305 determining an oblique image region of interest from at least one oblique image 311 based on latitude/longitude 317. System 300 can include estimated height processor 307 determining estimated height 325 of traffic management feature 108, and traffic management feature processor 327 generating, by machine learning process 331, traffic management feature bounding box pixels 333 for traffic management features 108 within oblique image region of interest 321. Traffic management feature processor 327 can calculate coordinates 345 of traffic management feature 108 based on homography transform 347. Homography processor 341 can provide homography transform 347 based at least on estimated height 325 and traffic management feature bounding box pixels 333. Traffic management feature processor 327 can provide traffic management feature 3D coordinates to map processor 343.

Figure 21:
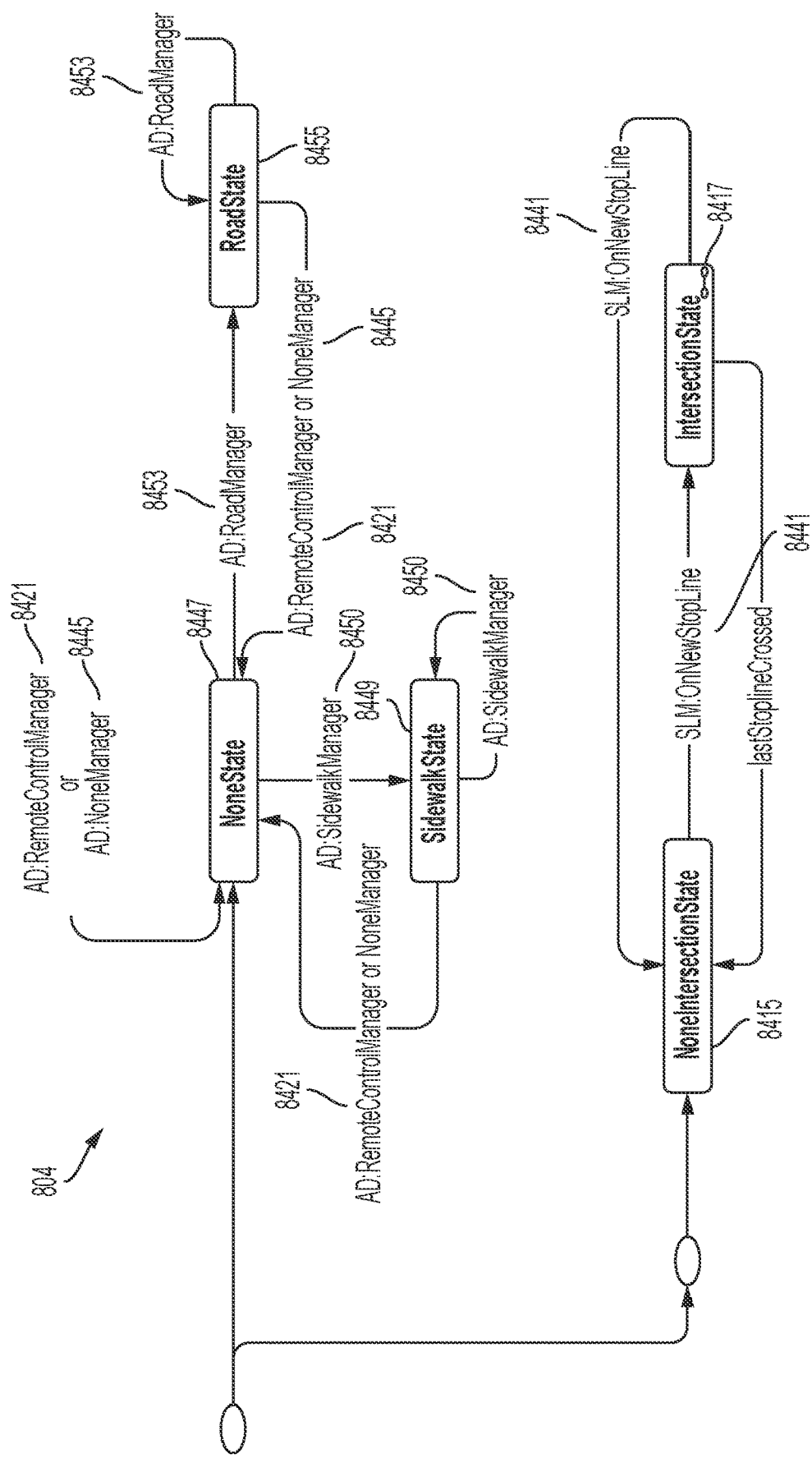
FIGS. 21-24 are state diagrams of an implementation of the present teachings.

Referring now to FIG. 21, the state transition diagram depicts the transitions within each of the manager and intersection finite state machines (FSMs) states. The manager FSM state is initialized with none state 8447 and transitions when AD 805 (FIG. 8) transitions to run state and publishes a non-none manager (road manager 8453 or sidewalk manager 8450). If AD 805 (FIG. 8) transitions to remote control state 8425 (FIG. 8), the active manager is published as remote control manager 8421 (FIG. 8) which causes the manager FSM to transition into none state 8447. When the control returns from remote to local, i.e. when the remotely-controlled portion of the route is traversed, AD 805 (FIG. 8) returns to run state and publishes a non-none (and non-remote control) manager, which triggers the manager FSM to switch to either road state 8455 or sidewalk state 8449.

Continuing to refer to FIG. 21, intersection FSM 8461 (FIG. 8) is initialized with the starting state of none intersection state 8415, which is a placeholder in case it is required to transition to an intersection state after stop line 8011 (FIG. 1A) is published by SLM 807 (FIG. 8). None intersection state 8415 retains the same speed set by road state 8455 or sidewalk state 8449. If stop line 8011 (FIG. 1A) is published by SLM 807 (FIG. 8), the intersection FSM state transitions to a child/derived state of intersection state 8417 based on the manager context and a decision process inside intersection state 8417 described herein. In some configurations, intersection FSM 8461 (FIG. 8) transitions from none intersection state 8415 to a child of intersection state 8417 upon receiving a new stop line 8011 (FIG. 1A) from SLM 807 (FIG. 8) and back to none intersection state 8415 after crossing stop line 8011 (FIG. 1A). For every new stop line 8011 (FIG. 1A), there is a transition from none-intersection state 8415 to intersection state 8417. For every crossing of stop line 8011, there is a transition from intersection state 8417 to none intersection state 8415. As long as AD 805 (FIG. 8) assigns the active manager to be remote control manager 8421 or none manager 8445, system 801 can remain in none state 8447. In none state 8447, AD 805 (FIG. 8) can set the maximum speed to a pre-selected value. In some configurations, the pre-selected value can be 0.0 m/s. If AD 805 (FIG. 8) assigns the active manager to be road manager 8415, system 801 can enter road state 8455 and remain in road state 8455 until AD 805 (FIG. 8) assigns the active manager to be remote control manager 8421 or none manager 8445, returning manager layer 801 (FIG. 8) to none state 8447. If AD 805 (FIG. 8) assigns the active manager to be sidewalk manager 8450, manager layer 801 can enter sidewalk state 8449 and remain in sidewalk state 8449 until AD 805 (FIG. 8) assigns the active manager to be remote control manager 8421 or none manager 8445, returning manager layer 801 (FIG. 8) to none state 8447 or road state 8455. If intersection FSM 8461 (FIG. 8) is in none intersection state 8415, SLM 807 indicates 8441 that the AV has reached new stop line 8011 (FIG. 1A), which can trigger intersection FSM 8461 (FIG. 8) to enter intersection state 8417. In some configurations, intersection FSM 8461 (FIG. 8) can cycle between none intersection state 8415 (when stop line 8011 (FIG. 1A) is crossed and addressed, or when the AV is not in an intersection) and a child of intersection state 8417 (when a new stop line 8011 (FIG. 1A) is received). Stop line 8011 (FIG. 1A) is considered crossed when the AV reaches stop line 8011 (FIG. 1A) and a decision is made whether to enter the intersection or not. The decision is based at least on the AV's location information and information about stop line 8011 (FIG. 1A). Intersection state 8417 is a transient state meaning manager FSM 804 can never be in this state but only in one of children states (8425, 8432, 8431) or the none intersection state 8415. In some configurations, before addressing each new stop line 8011 (FIG. 1A), a transition to none-intersection state 8415 can mark the end of addressing a previous stop line 8011 (FIG. 1A).

Figure 22:
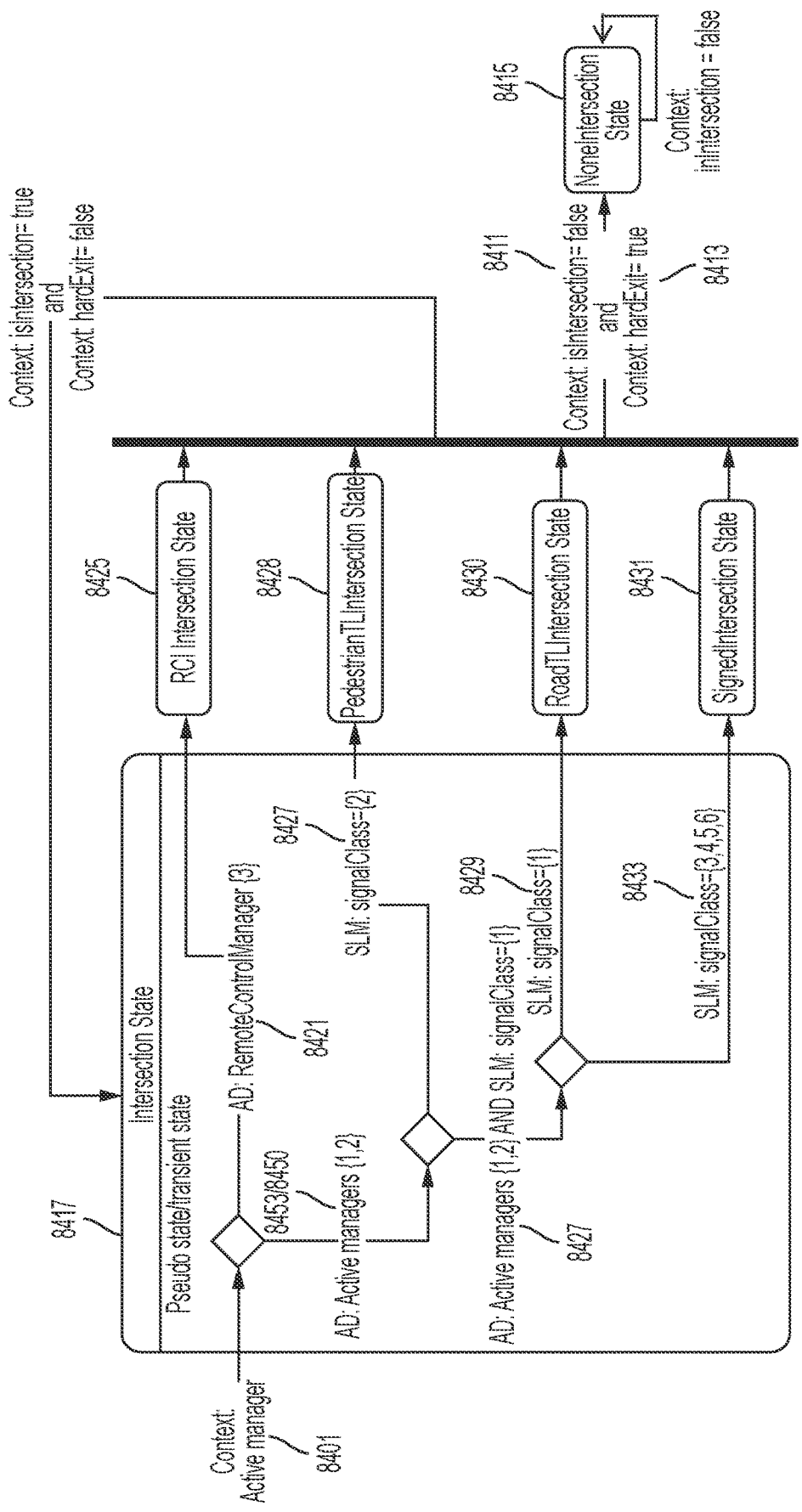

Referring now to FIG. 22, intersection state 8417 is a transient state that, in conjunction with the intersection FSM 8461, decides to which state to transition based at least on the manager context. The components of the manager context that help decide which intersection child state is next can include (1) if AD 805 (FIG. 8) is in remote control state 8425, and (2) if the current stop line's signal class has certain values. If, for any reason, the AV is being remotely controlled while the AV is in intersection state 8417, remote control intersection state 8425 is entered. If the AV is not being controlled remotely, the value of the signal class and the active manager are used to determine to which child state to switch: pedestrian signaled intersection state 8428, road signaled intersection state 8430, or signed intersection state 8431. The child intersection state is switched if for any reason the route has been changed or if the AV has reached stop line 8011 (FIG. 1A) (isIntersection=false 8411) or hard exit 8413 has been encountered. In these cases, the AV transitions to none intersection state 8415. When stop line 8011 (FIG. 1A) is reached, a decision about the intersection can be made. Some possible decisions include calling remote control, proceeding through the intersection, and requesting a start request from remote control. Following this decision, hard exit 8413 is indicated when the AV crosses stop line 8011 (FIG. 1A).

Continuing to refer to FIG. 22, a remote control stop request can be sent from the remote control processor to the AV to assist the managers' decision-making based on the context. If the remote control processor determines that the AV is making a wrong decision, the remote control processor can intervene by sending a stop request which can bring the AV to a halt at stop line 8011 (FIG. 1A). When this sequence of events happens, the AV can wait for remote control action at stop line 8011 (FIG. 1A). In some configurations, the remote control processor can send a start request if the intersection is clear, for example, in unsignaled intersections, or if the traffic light state is green, in signaled intersections. When the AV is being controlled remotely, the remote control processor can determine if the intersection is signaled or signed. If the intersection is signaled, the remote control processor can determine the state of the signal, for example, if the traffic light is green, and if the intersection is clear. If the light is green and the intersection is clear, the remote control processor can drive the AV through the intersection, or can return control to the AV which can possibly drive itself through the intersection. If the intersection is signed, the remote control processor can determine if the right of way is clear. If the right of way is clear, the remote control processor can drive the AV through the intersection. In some configurations, the remote control processor can retain control throughout the navigation of the intersection. Other configurations are contemplated by the present teachings. In some configurations, autonomous control can be returned to the AV if the AV is simply waiting for a start request from the remote control processor. If the AV has crossed the perception minimum range line, if the remote control processor sends a stop request, the AV can request to relinquish control to the remote control processor. If the remote control processor sends a stop request to the AV when the AV is in the middle of the intersection, the AV can request to relinquish control to the remote control processor until navigation of the intersection is complete.

Continuing to refer to FIG. 22, AD 805 (FIG. 8) can assign a manager as active manager 8401 based on a lane classification made available by provider layer 808 (FIG. 8). In some configurations, this information can be stored in a pre-created map or navigation graph 806 (FIG. 8). If AD 805 (FIG. 8) assigns remote control manager 8421 as active manager 8401 due to, for example, but not limited to, the lane classification or the remote control processor taking control, system 8461 (FIG. 8) enters remote control intersection state 8425 in which a remote control means guides the AV through the intersection. If AD 805 (FIG. 8) assigns active manager 8401 to be road manager 8453 or sidewalk manager 8450, and if there is a traffic signal in the intersection (SLM 807 (FIG. 8) provides traffic signaled classes 1,2 8429/8427), system 8461 (FIG. 8) enters a child of signaled state 8432, either road traffic light state 8430 or pedestrian traffic light state 8428. If there is a traffic sign at the intersection (SLM 807 (FIG. 8) provides traffic signed classes 3-6 8433), system 8461 (FIG. 8) enters signed intersection state 8431. For every pre-selected time period, there is a check to determine if system 8461 (FIG. 8) and manager FSM 804 (FIG. 8) have to be changed. At the same time there is a check for a hard exit. If there is a hard exit, the system can switch out of none-intersection state 8415. None-intersection state 8415 enables the situation in which the AV has not encountered an intersection. In this case, manager layer 801 (FIG. 8) provides the maximum speed set by AD 805 (FIG. 8) to driver layer 813 (FIG. 8) without alterations. Manager layer 801 receives a stop line message from SLM 807 when the AV is at perception range maximum. Intersection state 8417 enables the situation in which the AV has encountered an intersection which is equivalent to receiving a stop line message from SLM 807 (FIG. 8). In this case, manager layer 801 (FIG. 8) dissects the message from SLM 807 (FIG. 8) in order to choose the intersection state type. Intersection state types can include, but are not limited to including, remote control state 8425, signaled road state 8430, signaled pedestrian state 8428, and signed state 8431. Each intersection state can be further quantified as, for example, but not limited to, (0) unknown, (1) traffic light, (2) pedestrian light, (3) right of way, (4) stop, (5) rolling stop, and (6) yield. In remote control intersection state 8425, quantifiers (0)-(6) apply, and remote control is active in the intersection. In signaled road/pedestrian intersection states 8430/8428, quantifiers (1) and (2) apply, and the upcoming intersection includes at least one traffic light. In signed intersection state 8431, quantifiers (3)-(6) apply, and the upcoming intersection includes at least one traffic sign which may be a virtual sign introduced by a pre-defined map supplied to SLM 807 (FIG. 8) and then to the manager layer 801 (FIG. 8) via the SLM message.

Figure 23:
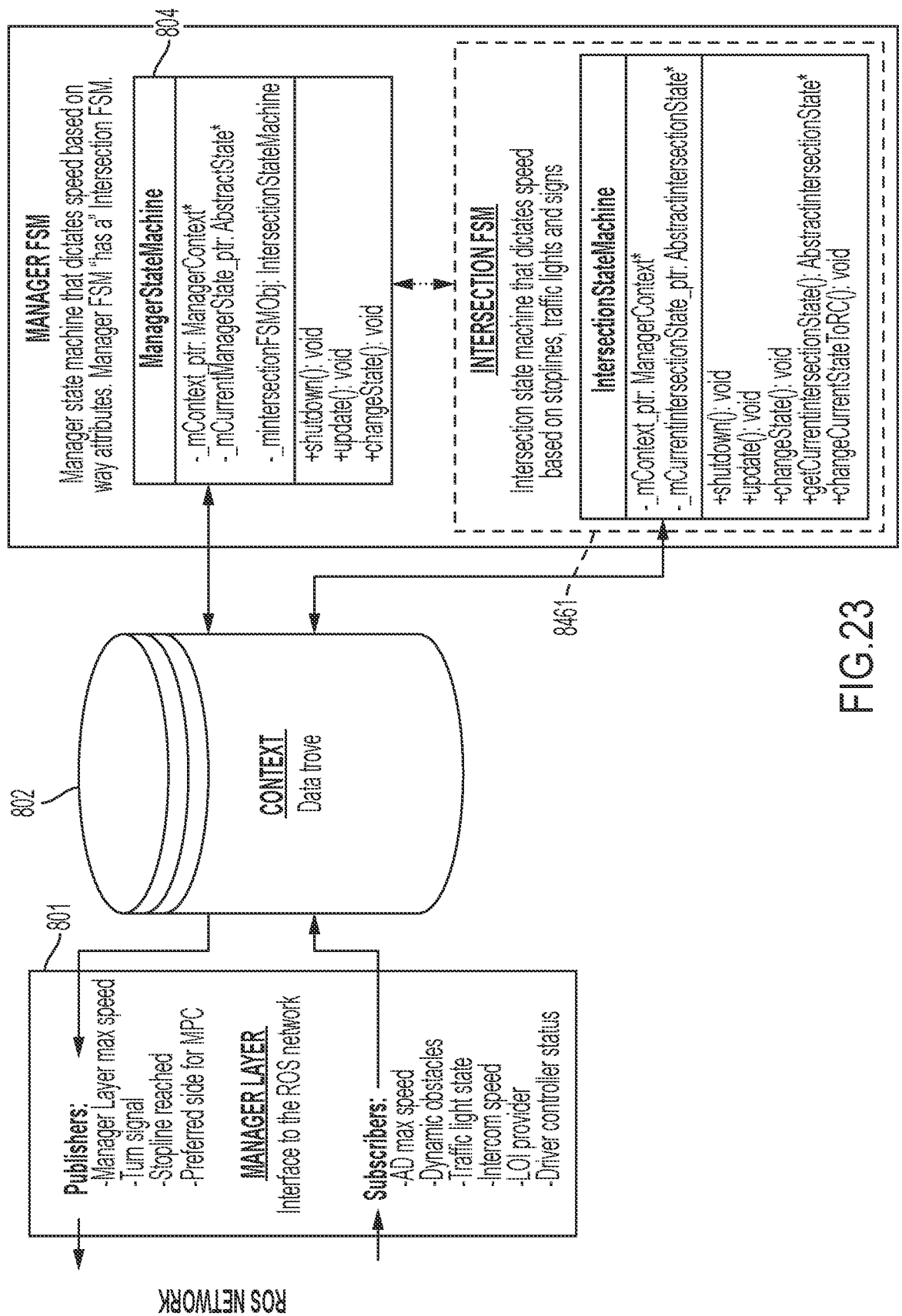

Referring now to FIG. 23, in one implementation of the present teachings, the system can include data trove 802 that can retain information generated and used by the state machines in the system such as manager state machine 804 and intersection FSM 8461. In this implementation data trove 802 can store the data generated by the state machines that are published by manager layer 801 to, for example, but not limited to, a ROS network. Other networks and structures for moving data from one system facility to another are contemplated. In some configurations, data trove 802 can be omitted entirely or can store any type of subset of the data passing between manager layer 801 and the state machines. In the illustrated implementation, published data can include the maximum speed of the AV, computed by the system of the present teachings and provided to MPC 812 (FIG. 8). As described herein, the speed of the AV can vary as the AV approaches an intersection, for example. Published data can also include stop line information such as that the AV has reached a stop line. Other published data can include a turn signal and a preferred side for the AV to travel on. The preferred side relates to the size of the area around, for example, an obstacle.

Continuing to refer to FIG. 23, data that can be received by manager layer 801 can include, but are not limited to including, a maximum speed based upon the type of travel surface the AV is navigating, for example, but not limited to, a road or a pedestrian walkway. Manager layer 801 can also receive information about dynamic obstacles traveling through the intersection and the states state of traffic lights associated with the intersection. These data can be gathered by sensors riding on the AV, among other possibilities, for example, but not limited to mounted sensors and/or aerial sensors mounted at locations in the vicinity of the navigation route. Other data can include intercom speed, lane of interest, and driver controller status. The intercom speed is the current speed of AV. The lane of interest is the lane of concern at an intersection. The driver control status relates to where the stop line is positioned when a curb or curb cut is on the navigation route. The driver control status indicates when the system of the present teachings recognizes the arrival at an intersection. Only after the curb traversal is complete will the system recognize that the AV has arrived at an intersection. From the received data, manager state machine 804 can determine a context for the manager that has control, and intersection FSM 8461 can switch to a state machine that handles the current intersection type in the context of the controlling manager.

Figure 24:
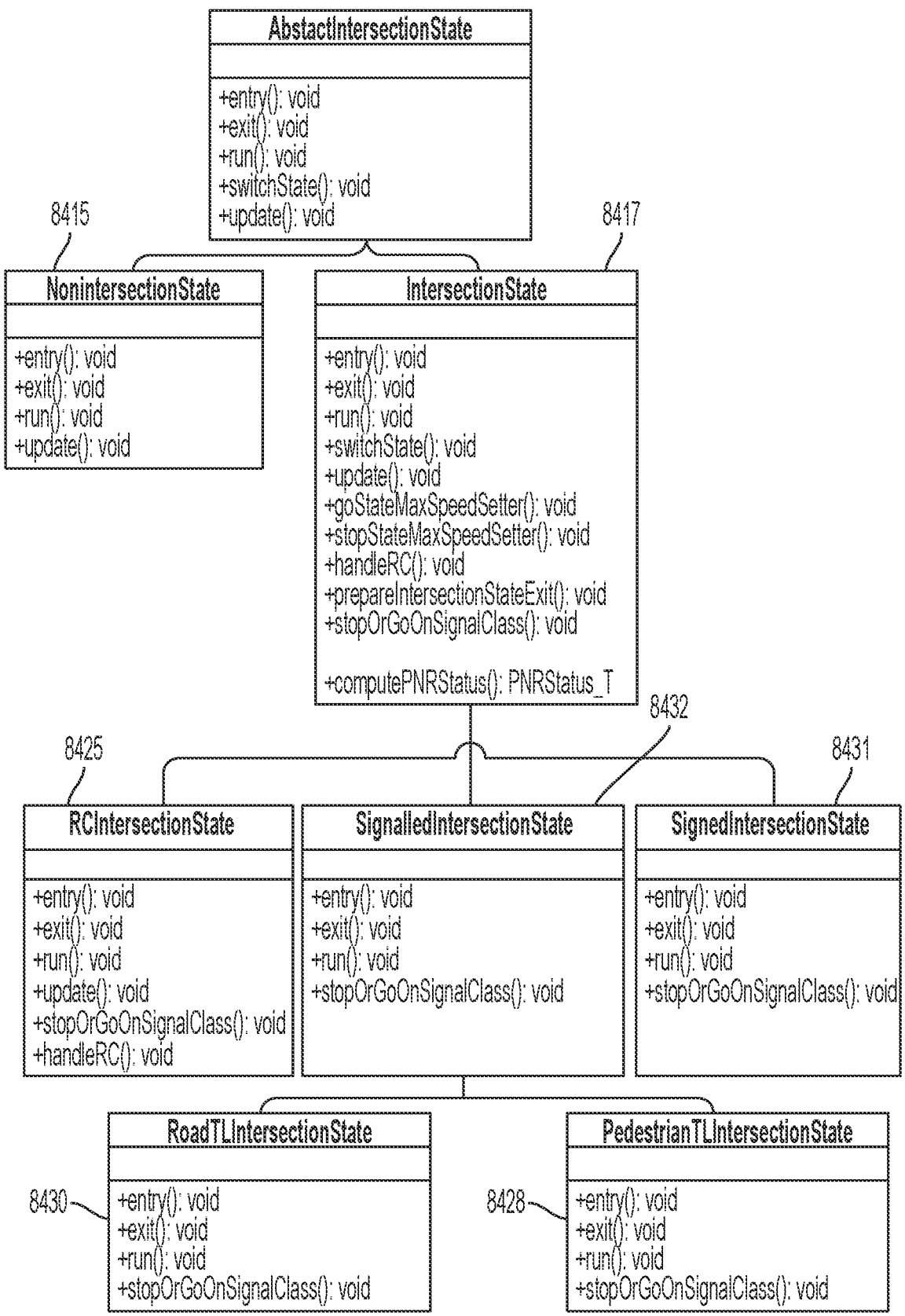

Referring now to FIG. 24, an implementation of the system of the present teachings can include various state machines, as discussed herein. The AV can find itself in any of the depicted states, and can be subject to the various listed events when in the state. The states and events listed herein are exemplary and non-limiting. The architecture illustrated in FIG. 24 can accommodate a variety of other states and events.

Figure 25:
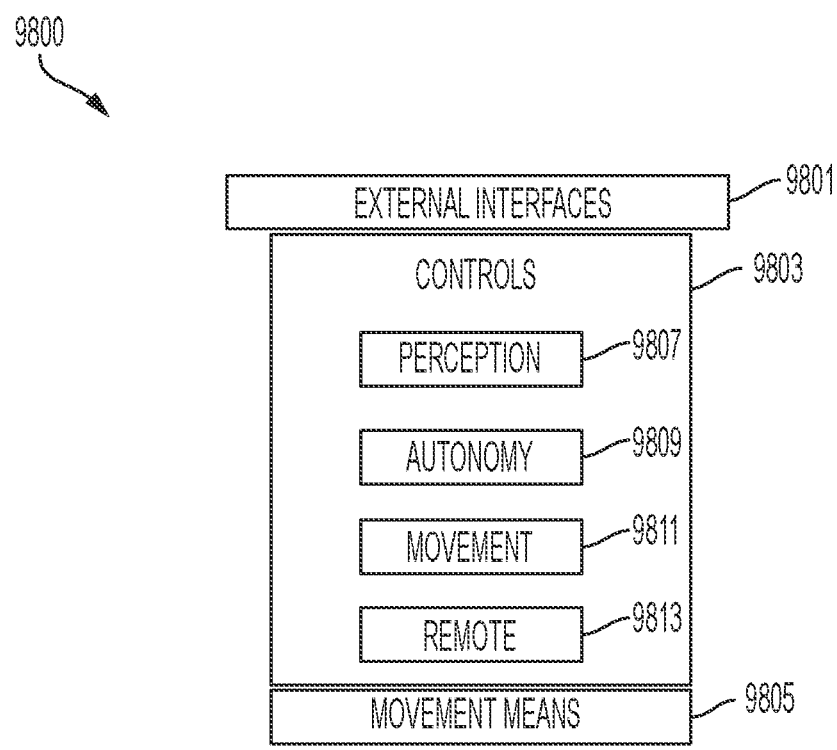
FIG. 25 is a schematic block diagram of a system of the present teachings that could be used to implement an implementation of the present teachings.

Referring now to FIG. 25, exemplary AV 9800 that can autonomously navigate intersections can include, but is not limited to including, external interfaces 9801, controls 9803, and movement means 9805. External interfaces 9801 can provide the eyes, ears, other senses, and digital communications for exemplary AV 9800. External interfaces 9801 can include, but are not limited to including, long and short range sensors, such as but not limited to, RADAR, LIDAR, cameras, ultrasonic sensors, thermometers, audio sensors, and odor sensors, and digital communications such as Bluetooth and satellite. A microphone and a visual display can also be included. External interfaces 9801 can provide perception and other data to controls 9803. Controls 9803 can process the perception and other data that can provide real-time and historical information to inform a route that AV 9800 can follow. Controls 9803 can include processors such as, but not limited to including, perception 9807, autonomy 9809, movement 9811, and remote 9813. Perception processor 9807 can receive, filter, process, and fuse incoming sensor data that can inform the navigation process. For intersection navigation, such data can include an image of a traffic light, for example. Autonomy processor 9809 can process information needed for the AV to travel autonomously, and can direct other processors to make autonomous travel happen. Movement processor 9811 can enable the AV to follow the commands of autonomy processor 9809, and remote processor 9813 can manage whatever remote control is required for safe navigation. The processors that perform the work of controls 9803 can include execute software, firmware, and hardware instructions. Movement means 9805 can implement the commands of movement processor 9811. Movement means 9805 can include wheels, moveable tracks, or any other form of movement device.

Figure 26A:
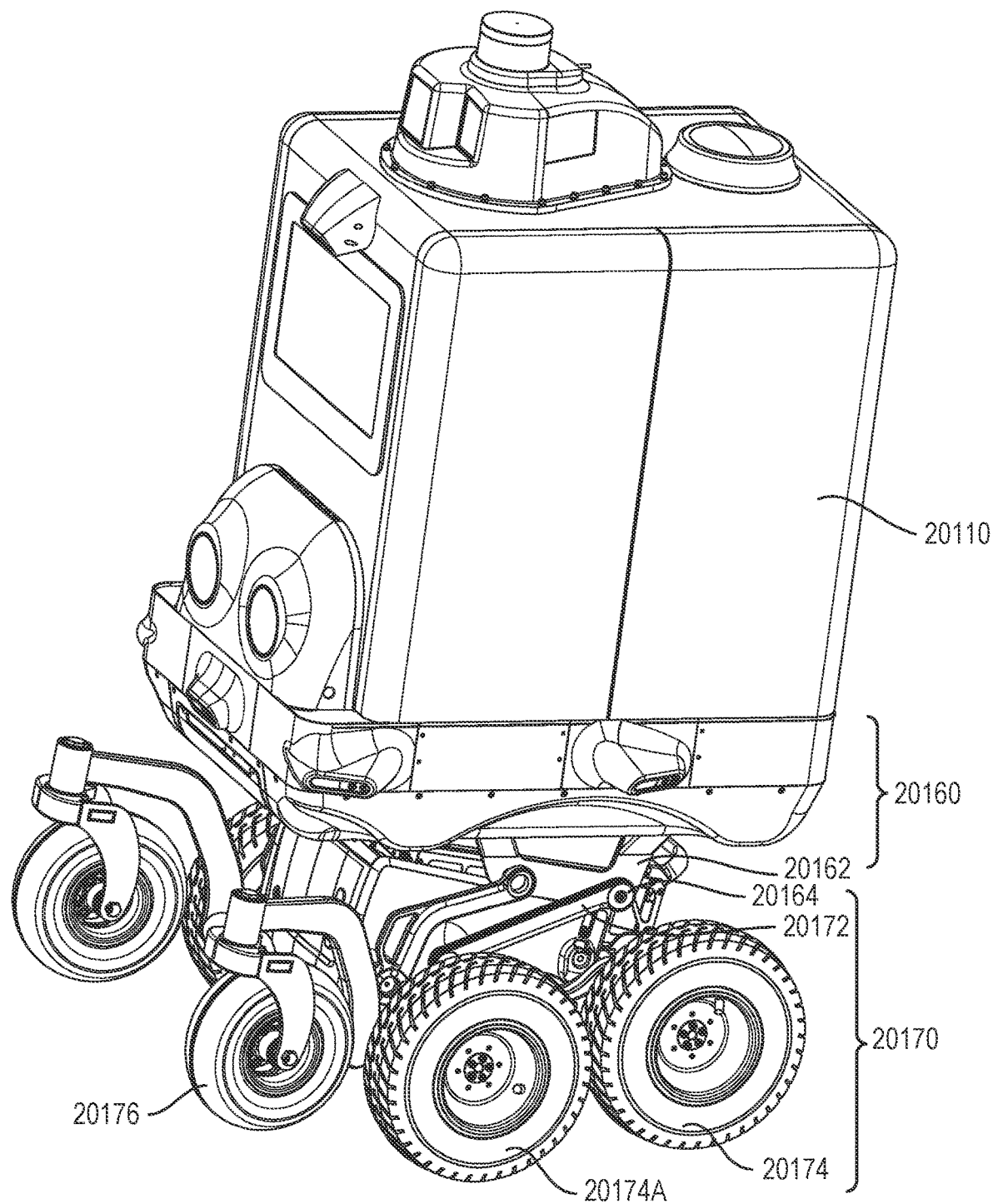
FIGS. 26A and 26B are perspective diagrams of two possible implementations of the AV that could be used to execute the system of the present teachings.
Figure 26B:
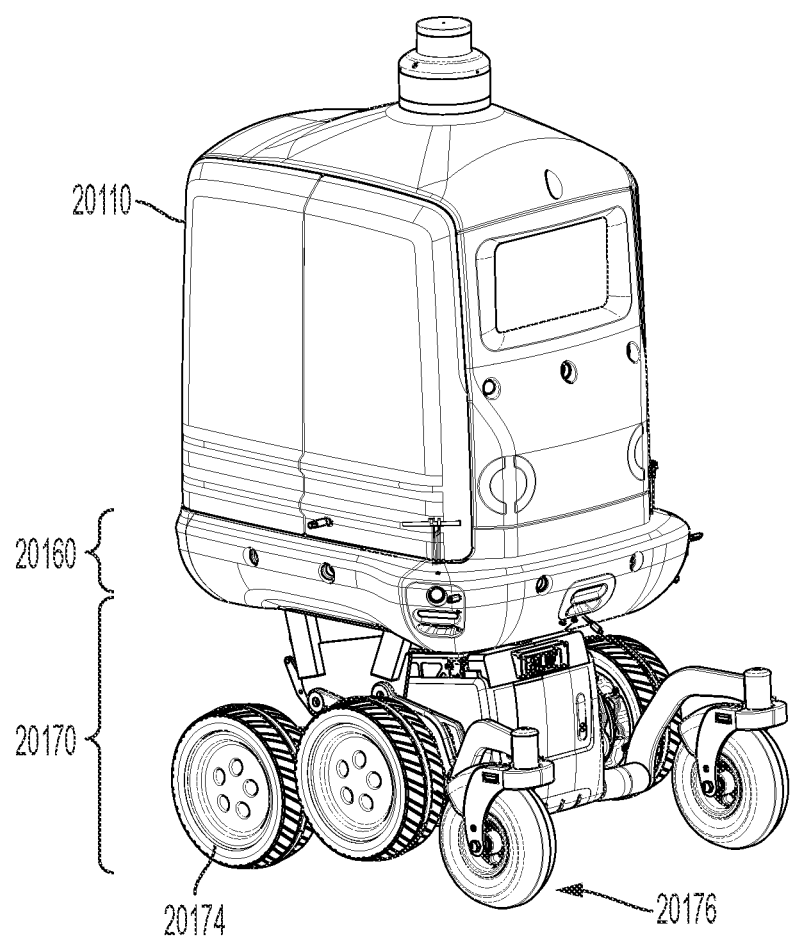

Referring now to FIGS. 26A and 26B, two configurations of exemplary AV 9800 (FIG. 14) are shown. The pictured configurations include similar, though not identical, parts, referred to herein by the same reference numbers because the variations in style do not change the functionality of the AV when traversing an intersection. In some configurations, the AV may be configured to deliver cargo and/or perform other functions involving navigating through an intersection. In some configurations, the AV can include cargo container 20110 that can be opened remotely, in response to user inputs, automatically or manually, to allow users to place or remove packages and other items. Cargo container 20110 is mounted on cargo platform 20160, which is operably coupled with power base 20170. Power base 20170 includes four powered wheels 20174 and two caster wheels 20176. Power base 20170 provides speed and directional control to move cargo container 20110 along the ground and over obstacles including discontinuous surface features. Cargo platform 20160 is connected to the power base 20170 through two U-frames 20162. Each U-frame 20162 is rigidly attached to the structure of cargo platform 20160 and includes two holes that allow rotatable joint 20164 to be formed with the end of each arm 20172 on power base 20170. Power base 20170 controls the rotational position of the arms and thus controls the height and attitude of cargo container 20110. The AV can include one or more processors that can implement the intersection traversal strategy described herein. In some configurations, the AV can, for example, use a different number of wheels or different sets of wheels to navigate. Wheel choices can be made based upon a lane's topography and road intersections. In some configurations, when the AV finds itself at an intersection and on a road, the AV can traverse the intersection using a wheel configuration that would accommodate relatively flat terrain. Such a configuration can include rear wheels 20174 (FIG. 26B) and caster wheels 20176 (FIG. 26B) connecting with the ground, while front wheels 20174A (FIG. 26B) are raised from the ground. In some configurations, when the AV finds itself at an intersection involving, for example, a sidewalk including discontinuous surface features such as curbs, the AV can traverse the intersection using a wheel configuration that can accommodate challenging terrain. Such a configuration can include rear wheels 20174 (FIG. 26A) and front wheels 20174A (FIG. 26A) connecting with the ground, while caster wheels 20176 (FIG. 26A) are raised from the ground.

Configurations of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. Parts of the system can operate on a computer having a variable number of CPUs. Other alternative computer platforms can be used.

The present configuration is also directed to software/firmware/hardware for accomplishing the methods discussed herein, and computer readable media storing software for accomplishing these methods. The various modules described herein can be accomplished on the same CPU, or can be accomplished on different CPUs. In compliance with the statute, the present configuration has been described in language more or less specific as to structural and methodical features. It is to be understood, however, that the present configuration is not limited to the specific features shown and described, since the means herein disclosed comprise preferred forms of putting the present configuration into effect.

Methods can be, in whole or in part, implemented electronically. Signals representing actions taken by elements of the system and other disclosed configurations can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form, subject to appropriate licenses where necessary, including, but not limited to, Graphic Interchange Format (GIF), Joint Photographic Experts Group (JPEG), Portable Network Graphics (PNG), Scalable Vector Graphics (SVG), and Tagged Image File Format (TIFF).

While the present teachings have been described above in terms of specific configurations, it is to be understood that they are not limited to these disclosed configurations. Many modifications and other configurations will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. Method of identifying a traffic management feature from an oblique image comprising:
   determining coordinates of corners of a region of interest from an aerial image;
   determining an oblique image region of interest from the oblique image based on the coordinates;
   determining an estimated height of the traffic management feature;
   generating bounding box pixels for the traffic management feature within the oblique image region of interest; and
   calculating coordinates of the traffic management feature based on a homography transform based on the estimated height and the traffic management feature bounding box pixels.

2. Method of claim 1 further comprising navigating a vehicle based on said identifying.

3. Method of claim 2 wherein said navigating relates to an intersection selected from: a signed intersection; a signaled intersection; an automobile traffic lane; a pedestrian walkway; and combinations thereof.

4. Method of claim 3 wherein the intersection comprises an obstacle.

5. Method of claim 4 further comprising determining an entry decision based on:
   a distance between the obstacle at a current cycle and the vehicle;
   a speed of the obstacle at the current cycle; and
   an existence of the obstacle in the intersection at a previous cycle;
   wherein the previous cycle and the current cycle define different times in a window.

6. Method of claim 5 further comprising weighting the entry decision based on an entry decision at the previous cycle.

7. Method of claim 1 wherein the traffic management feature comprises: a traffic light; a traffic sign; a pedestrian signal; a pedestrian sign; and combinations thereof.

8. Method of navigating a vehicle comprising:
   receiving information about an obstacle in an intersection;
   computing a weighting factor at a first time;
   modifying the first time based on when none of the obstacles were in the intersection and defining a modified first time;
   modifying the weighting factor at the modified first time based on the weighting factor at a second time, the second time occurring before the modified first time;
   computing an intersection decision threshold based on the weighting factor; and
   commanding the vehicle to perform an action with respect to the intersection based on the intersection decision threshold.

9. Method of claim 8 further comprising, prior to said receiving, slowing the vehicle from a point of no return to a stop line if the point is in a travel path.

10. Method of claim 8 wherein said commanding is based on a type of the intersection.

11. Method of claim 10 further comprising determining the type.

12. Method of claim 10 wherein the type comprises: a signed intersection; a signaled intersection; an automobile traffic lane; a pedestrian walkway; and combinations thereof.

13. Method of claim 8 wherein said commanding is contingent on whether the vehicle has a right of way at the intersection.

14. Method as in claim 8 further comprising identifying a traffic management feature from an oblique image of the intersection comprising:
   determining coordinates of corners of a region of interest from an aerial image of the intersection;
   determining an oblique image region of interest from the oblique image based on the coordinates;
   determining an estimated height of the traffic management feature;
   generating bounding box pixels for the traffic management feature within the oblique image region of interest; and
   calculating coordinates of the traffic management feature based on a homography transform based on the estimated height and the traffic management feature bounding box pixels.

15. Method of claim 14 wherein the intersection comprises an obstacle.

16. Method of claim 15 further comprising determining an entry decision based on:
   a distance between the obstacle at a current cycle and the vehicle;

a speed of the obstacle at the current cycle; and
an existence of the obstacle in the intersection at a previous cycle;
wherein the previous cycle and the current cycle define different times in a window.

17. Method of claim 16 further comprising weighting the entry decision based on an entry decision at the previous cycle.

18. Method of claim 14 wherein the at least one traffic management feature comprises: a traffic light; a traffic sign; a pedestrian signal; a pedestrian sign; and combinations thereof.

* * * * *